(12) United States Patent
Jerman et al.

(10) Patent No.: US 6,836,584 B1
(45) Date of Patent: Dec. 28, 2004

(54) OPTICAL MICROSWITCH

(75) Inventors: John H. Jerman, Palo Alto, CA (US); John D. Grade, Mountain View, CA (US); Joseph D. Drake, Mountain View, CA (US); Kurt E. Petersen, San Jose, CA (US)

(73) Assignee: Iolon, Inc., San Jose, CA (US)

( * ) Notice: Subject to any disclaimer, the term of this patent is extended or adjusted under 35 U.S.C. 154(b) by 0 days.

(21) Appl. No.: 09/524,727

(22) Filed: Mar. 14, 2000

Related U.S. Application Data

(62) Division of application No. 09/135,236, filed on Aug. 17, 1998, now Pat. No. 6,134,207.
(60) Provisional application No. 60/071,038, filed on Jan. 13, 1998.

(51) Int. Cl.$^7$ ................................................ G02B 6/35
(52) U.S. Cl. ............................ 385/18; 385/25; 359/223
(58) Field of Search ............................. 385/18, 19, 25; 359/223

(56) References Cited

U.S. PATENT DOCUMENTS

| | | | |
|---|---|---|---|
| 4,239,330 A | 12/1980 | Ashkin et al. | 350/96.18 |
| 4,265,513 A | 5/1981 | Matsushita et al. | 350/96.2 |
| 4,304,460 A | 12/1981 | Tanaka et al. | 350/96.16 |
| 4,322,126 A | 3/1982 | Minowa et al. | 350/96.2 |
| 4,498,730 A | 2/1985 | Tanaka et al. | 350/96.16 |
| 4,626,066 A | 12/1986 | Levinson | 350/96.18 |
| 4,674,319 A | 6/1987 | Muller et al. | 73/23 |
| 4,740,410 A | 4/1988 | Muller et al. | 428/133 |
| 4,805,456 A | 2/1989 | Howe et al. | 73/517 AV |
| 4,896,937 A | 1/1990 | Kraetsch et al. | 350/96.2 |
| 4,943,750 A | 7/1990 | Howe et al. | 310/309 |
| 5,000,532 A | 3/1991 | Kraetsch et al. | 350/96.2 |
| 5,024,500 A | 6/1991 | Stanley et al. | 350/96.15 |
| 5,025,346 A | 6/1991 | Tang et al. | 361/283 |
| 5,043,043 A | 8/1991 | Howe et al. | 156/645 |
| 5,208,880 A * | 5/1993 | Riza et al. | 385/18 |
| 5,245,491 A | 9/1993 | Horie et al. | 360/114 |
| 5,255,260 A | 10/1993 | Yamada et al. | 369/199 |
| 5,260,928 A | 11/1993 | Lee et al. | 369/112 |
| 5,327,416 A | 7/1994 | Lee et al. | 369/199 |
| 5,446,811 A | 8/1995 | Field et al. | 385/23 |
| 5,450,751 A | 9/1995 | Putty et al. | 73/504.18 |
| 5,452,283 A | 9/1995 | Lee et al. | 369/112 |
| 5,493,440 A | 2/1996 | Souda et al. | 359/341 |
| 5,532,884 A | 7/1996 | Lee et al. | 359/833 |
| 5,563,466 A | 10/1996 | Rennex et al. | 310/309 |
| 5,646,928 A | 7/1997 | Wu et al. | 369/112 |

(List continued on next page.)

OTHER PUBLICATIONS

Field, L.A. et al., "Micromachined 1×2 Optical Fiber Switch", The 8th International Conference on Solid–State Sensors and Actuators, and Eurosensors IX, Stockholm, Sweden, Jun. 25–29, 1995, pp. 344–347.

(List continued on next page.)

*Primary Examiner*—John D. Lee
*Assistant Examiner*—Sung Pak
(74) *Attorney, Agent, or Firm*—Dorsey & Whitney LLP

(57) ABSTRACT

An optical microswitch for use with a laser beam that extends along a path comprising a body having an inlet port adapted to receive the laser beam and a plurality of outlet ports. A plurality of mirrors coupled to a plurality of micromotors carried by the body. The micromotors selectively move the mirrors from a first position out of the path of the laser beam to a second position into the path of the laser beam to direct the laser beam to one of the outlet ports. Each of the micromotors has at least one electrostatically-driven comb drive assembly therein for moving the respective mirror to one of the first and second positions. A controller is electrically coupled to the micromotors for providing control signals to the micromotors.

31 Claims, 18 Drawing Sheets

U.S. PATENT DOCUMENTS

| | | | |
|---|---|---|---|
| 5,647,030 A | | 7/1997 | Jorgenson et al. ............ 385/12 |
| 5,719,832 A | | 2/1998 | Kataoka et al. ............... 369/14 |
| 5,753,911 A | | 5/1998 | Yasuda et al. .............. 250/306 |
| 5,760,998 A | | 6/1998 | Berberich et al. ....... 360/97.02 |
| 5,835,458 A | | 11/1998 | Bischel et al. .......... 369/44.12 |
| 5,850,375 A | | 12/1998 | Wilde et al. .................. 369/14 |
| 5,960,132 A | * | 9/1999 | Lin .............................. 385/18 |
| 6,011,652 A | * | 1/2000 | Cushing ..................... 359/588 |
| 6,108,466 A | * | 8/2000 | Aksyuk et al. ............... 385/19 |
| 6,134,207 A | * | 10/2000 | Jerman et al. .............. 369/112 |

OTHER PUBLICATIONS

Hirano, Toshiki, et al., "Invar Micropositioner for Disk Drives", IEEE, Jan. 1997, pp. 378–382.

Horsley, D.A., et al., "Angular Micropositioner for Disk Drives", IEEE, Jan. 1997, pp. 454–459.

Jaecklin, V.P., et al., "Optical Microshutters and Torsional Micromirrors for Light Modulator Arrays", Proceedings IEEE Micro Electrical Mechanical Systems, Fort Lauderdale, FL, Feb. 7–10, 1993, pp. 124–127.

Klassen, E.H., et al., "Silicon Fusion Bonding and Deep Reactive Ion Etching; A New Technology for Microstructures", the 8th International Conference on Solid–State Sensors and Actuators, and Eurosensors IX, Stockholm, Sweden, Jun. 25–29, 1995, pp. 556–559.

Legtenberg, Rob, et al., "Comb–drive actuators for large displacements", J. Micromech. Microeng. 6 (1996), pp. 320–329.

Mohr, J., et al., "Micro Optical Switching by Electrostatic Linear Actuators with Large Displacements", The 7th International Conference on Solid–State Sensors and Actuators, Yokohama, Japan, 1993, pp. 120–123.

Obermeier, E., "Design and Fabrication of an Electrostatically Driven Micro–Shutter", The 7th International Conference on Solid–State Sensors and Actuators, Yokohama, Japan, 1993, pp. 132–135.

Tang, William C., et al., "Laterally Driven Polysilicon Resonant Microstructures", Sensors Actuators 20, 1989, pp. 25–31 (IEEE reprint pp. 53–59).

Wenk, B., et al., "Thick polysilicon based surface micromachined capacitive accelerometer with force feedback operation", SPIE vol. 2642, Oct. 1995, pp. 84–94.

Yasseen, A.A., et al., "A Rotary Electrostatic Micrometer 1×8 Optical Switch", IEEE, 1998, pp. 116–120.

* cited by examiner

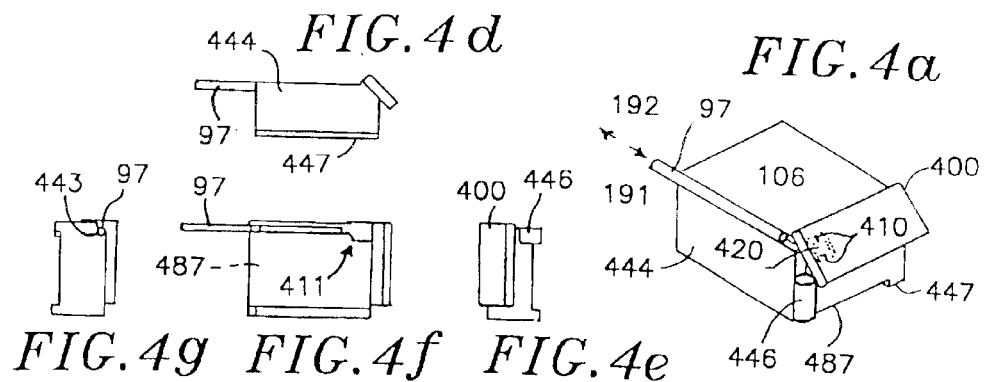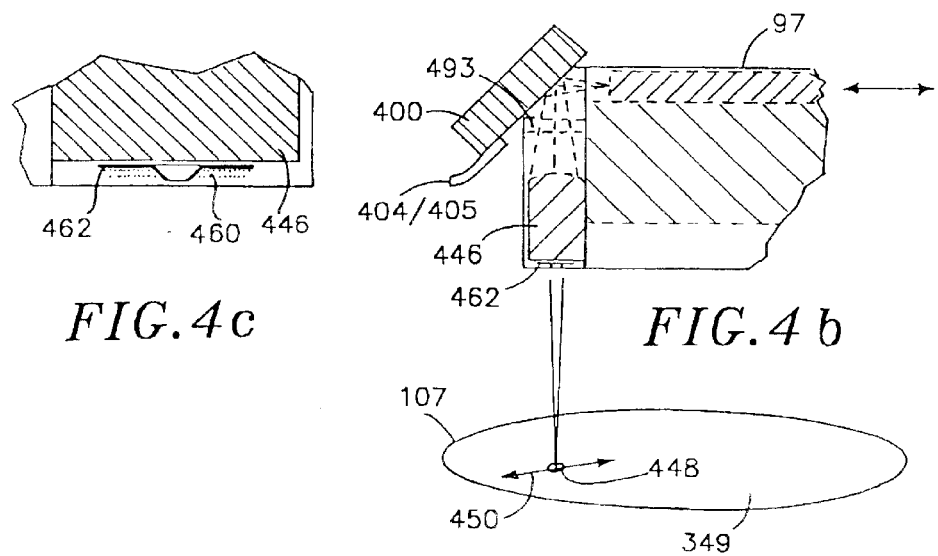

OPTICAL MICROSWITCH

CROSS-REFERENCE TO RELATED APPLICATION

The application is a DIV OF Ser. No. 09/135,236 Aug. 17, 1998 now U.S. Pat. No. 6,134,207, which claims benefit of 60/071,038 Jan. 13, 1998.

SCOPE OF THE INVENTION

The present invention relates generally to optical switches and more particularly to optical switches having a plurality of movable mirrors.

BACKGROUND

There has been considerable interest in switches for switching light from one optical fiber to another or from a free space optical beam to one or more optical fibers, particularly for telecommunications and digital data networking. A variety of switch configurations are of interest, including 1×2, 1×n, and n×n, where n is a number from 2 to about 64. A variety of principles have been utilized in prior art switches, including electro-optical effects and electro-mechanical actuators, and working switches are now commercially available using these techniques. The prior art switches are very expensive and rather large.

Prior art 1×n electromechanical optical fiber switches have typically either moved the input fiber so that it is in communication with the desired output fiber, moved a single mirror so that the input light couples to the desired output fiber or moved a refractive optical element until the desired coupling is obtained. Typically collimating lenses are arranged at each optical fiber so that a collimated beam is being switched by the electromechanical actuator. An example of such a switch is described in U.S. Pat. No. 4,322,126 by Minowa et. al., where a prism-like structure is moved between input and output optical fibers. An alternative prior art approach where a single mirror is translated to deflect a collimated beam into multiple output fibers is described in U.S. Pat. No. 5,208,880 by Riza et. al. Various approaches have used a single rotating mirror to couple light into a plurality of output fibers, such as described in U.S. Pat. No. 5,647,030.

Most of the prior art approaches have used a single electromechanical actuator, either a linear or angular actuator, to deflect the input optical beam because the prior art electromechanical actuators have been large and expensive. The single electromechanical actuator has typically had a mechanism to accurately control the position of the mirror in order to accurately couple the light into the output fiber. This accurate mirror positioning also increases the size and cost of prior art actuators, particularly for numbers of output fibers larger than two, where simple methods are not readily available for achieving the required position resolution.

Most of the prior art optical switches are designed for use in telecommunications application where the wavelength of light used is typically 1.5 microns or 1.3 microns in the infrared. Also many of the prior art switches have been designed for use with a so-called multi-mode optical fiber, which has a relatively large central core that carries the light, especially for use in the infrared. The positional accuracy necessary for achieving high optical coupling is on the order of one fifth the diameter of the central optical core of the optical fiber. Most multimode fiber for use in the infrared has a core diameter of about 50 microns, so that positional accuracy in coupling need only be to within about 10 microns, which can be achieved using conventional techniques.

It is desirable in many optical systems to use a so-called single-mode optical fiber that can achieve greater optical bandwidth. The core diameter of these fibers is about eight microns for use in the infrared and about four microns for use with red light. The required positional accuracy is thus reduced to less than 1 micron for these systems, about a factor of ten less than for prior art multimode optical switches.

Microstructures fabricated using silicon integrated circuit processing techniques have been developed for a variety of sensing and actuation applications. Compared to conventional prior art implementations in these and other applications, micro-structures provide advantages in cost, reliability and performance. Integrated actuators, that is, microstructures where the actuator is fabricated simultaneously with the mechanical structure, are advantageous from the standpoint of cost, reliability and ease in assembly.

Various actuation methods have been used for integrated actuators for microstructures including electrostatic, electromagnetic, thermal and thermo-pneumatic. The thermal techniques tend to provide large force but with relatively slow response times. Electromagnetic techniques are complicated by the difficulty in providing integrated coils with sufficient number of turns in a planar structure and the high power dissipation caused by the high currents needed to produce the desired magnetic field. Electrostatic actuation becomes attractive on a small size scale as the forces increase as the gap between elements decrease. The power dissipated by electrostatic elements tends to be low and the operating speed is usually limited only by the mechanical response of the structure.

The driving forces in prior art electrostatic actuators have been typically created using only one of two types of driving electrodes: so-called comb drive fingers or parallel plates. Parallel plate capacitors generate a force that is proportional to the square of the drive voltage and inversely proportional to the square of the gap between the plates. For practical microstructure elements, the useful range of motion for parallel plate actuators is less than 10 microns. Comb drive actuators, such as described in U.S. Pat. No. 5,025,346 to Tang et al., feature a series of interdigitated electrodes whose capacitance may be used to provide a motive force that is relatively constant over a range of motion roughly equal to the length of the comb fingers, which can be made greater than 100 microns. The force available from each finger is relatively small, so that practical comb drive actuators typically have between 10 and 200 fingers to produce adequate force for a microstructure device.

The early comb drive actuators used thin, polysilicon layers provided by the so-called surface micro-machining process to fabricate the comb fingers and the moveable, laterally-driven element. This polysilicon was typically 1–2 microns thick. Since the lateral feature size of these devices was comparable to the material thickness, the stiffness of the parts to out-of-plane deflections was very low. The advent of Deep Reactive Ion Etching (DRIE) has allowed similar structures to be fabricated in single crystal silicon with typical thicknesses of 100 microns. DRIE is described in a paper entitled, "Silicon Fusion Bonding And Deep Reactive Ion Etching; A New Technology For Microstructures" By Klassen, Petersen, Noworolski, Logan, Maluf, Brown, Storment, McCully, and Kovacs, in the Proceedings Of Transducers '95 (1995), pages 556–559. These thicker structures can provide larger vertical electrode areas and substantially higher stiffnesses out of the plane of deflection. Recently, other fabrication techniques, including thicker surface micro-machined polysilicon or plated metal structures made in photolithographically defined molds have been used to increase the thickness and thus the out-of-plane stiffness of comb drive structures.

In general, it is an object of the present invention to provide an optical microswitch which overcomes the foregoing disadvantages.

Another object of the invention is to provide an optical microswitch of the above character which utilizes at least one electrostatic microactuator having at least one comb drive assembly therein.

Another object of the invention is to provide an optical microswitch of the above character in which a plurality of electrostatic microactuators are aligned along at least one hall of the microswitch.

Another object of the invention is to provide an optical microswitch of the above character for use in a magneto-optical data storage system.

SUMMARY OF THE INVENTION

The present invention provides optical switches and the like utilizing large deflection high speed microactuators. The microactuators may be used in optical switches of a variety of designs. The optical switch may be used in a variety of systems such as magneto-optical data storage systems, telecommunications systems or data transmission systems.

BRIEF DESCRIPTION OF THE DRAWINGS

The accompanying drawings, which are somewhat schematic in many instances and are incorporated in and form a part of this specification, illustrate several embodiments of the invention and, together with the description, serve to explain the principles of the invention.

FIGS. 4a–4g show the flying magneto-optical head of the magneto-optical data storage and retrieval system of FIG. 1 in a perspective, a side cross-sectional, an expanded cross-sectional, a side, a front, a bottom and a rear view, respectively.

DESCRIPTION OF THE INVENTION

Figure 11:
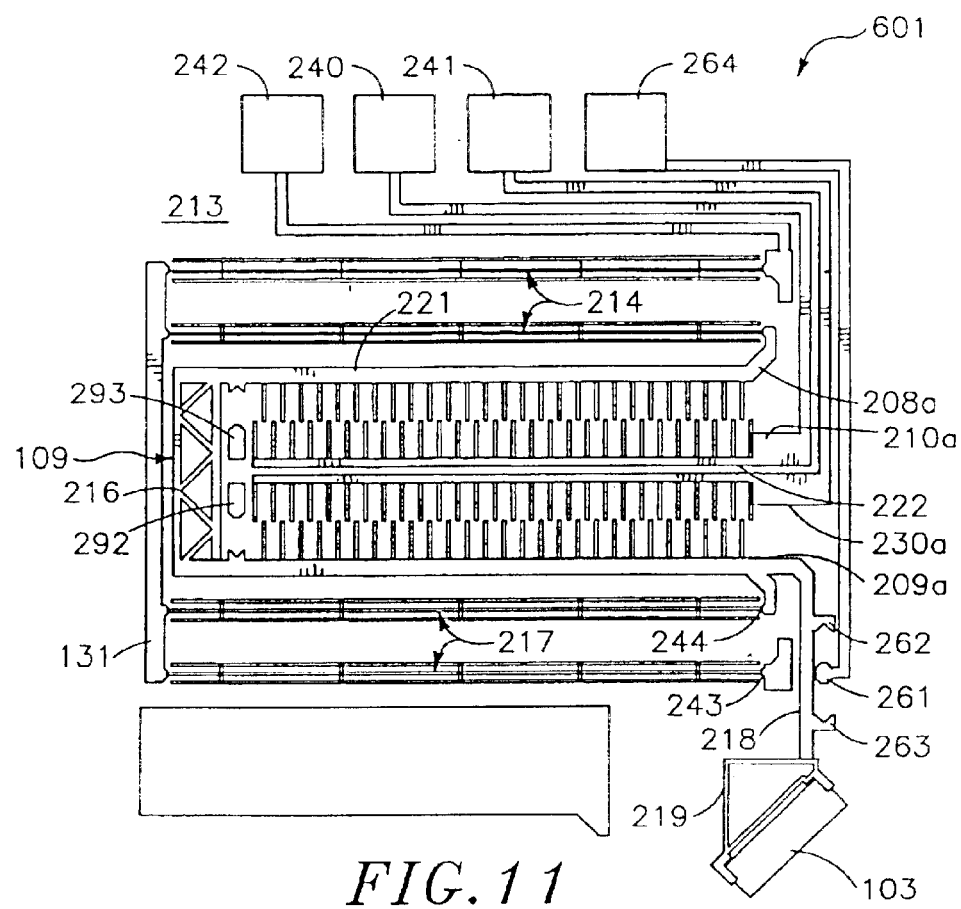
FIG. 11 is a plan view of a further embodiment of an electrostatic microactuator for use in the optical microswitch of the present invention.

Referring now to the drawings, FIG. 11 is a plan view illustrating some of the basic elements of a magneto-optical (MO) data storage and retrieval system. Few specific details are identified in this and FIGS. 2 through 4 as they are intended to portray some of the basic elements of a functional system in which the present invention is useful. The invention is not limited to use in only one specific MO data storage system and, as discussed below, is not limited to use in MO data storage systems but can be used in telecommunications or other systems.

Figure 1:
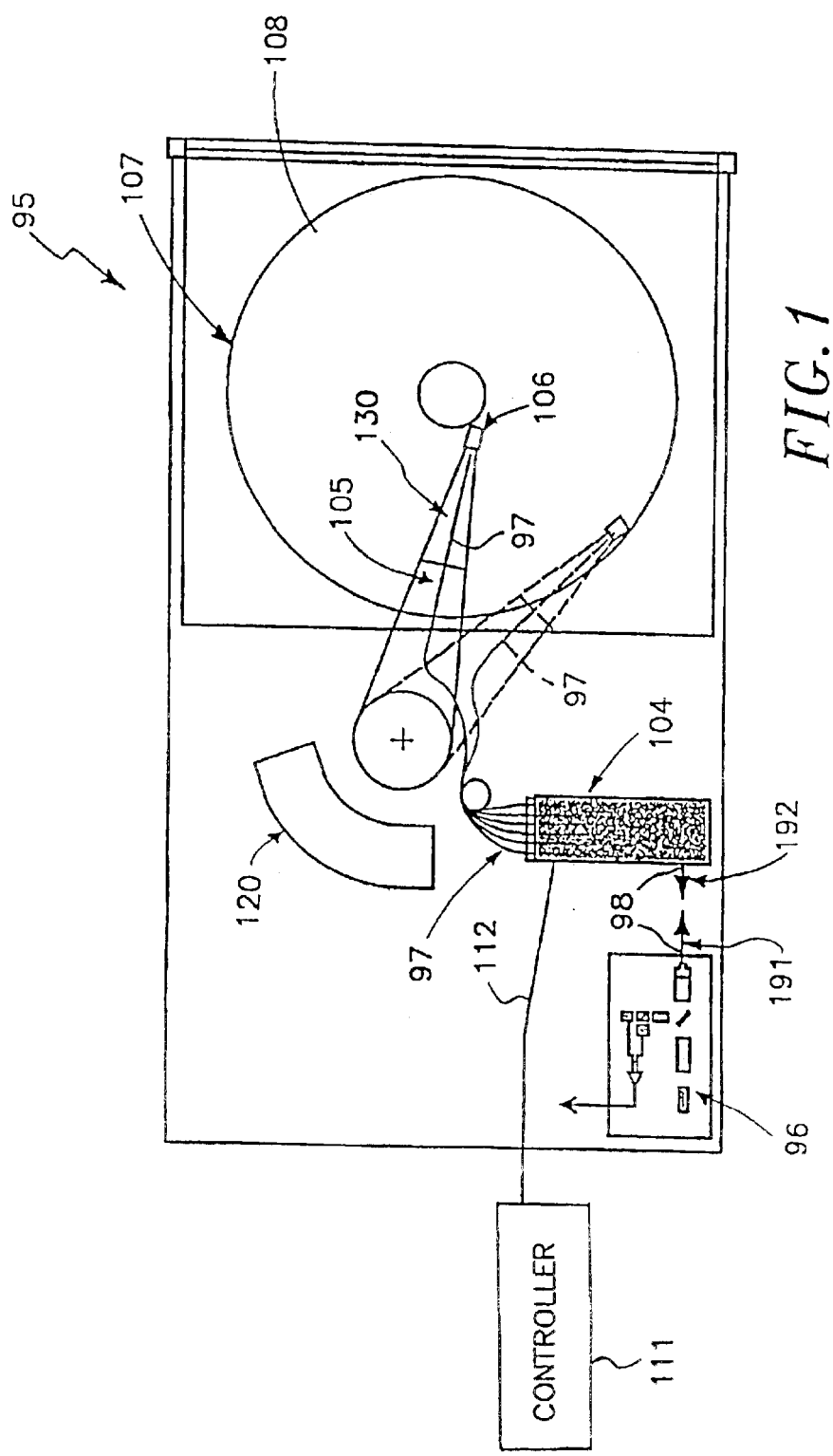
FIG. 1 is a view of a magneto-optical data storage and retrieval system incorporating the optical microswitch of the present invention.

Referring to FIG. 1, the system 95 includes a set of flying heads 106 whose details will be described below that are adapted for use with a plurality of "N" MO discs 107. In a preferred embodiment, N equals six and thus a plurality of six discs 107 are provided in a stack (not shown). Each of the discs 107 is double sided and provided with first and second opposite planar surfaces 108. One flying head 106 is provided for each MO disc surface 108. The heads 106 are coupled to a rotary actuator magnet and coil assembly 120 by a suspension 130 and actuator arm 105 to be positioned over the surfaces of the MO discs 107. In operation, the MO discs 107 are rotated by a spindle motor (not shown) to generate aerodynamic lift forces between the flying heads 106 and the rotating disc. This maintains each flying MO head 106 in a flying condition above the data recording surface of each MO disc. The lift forces are opposed by equal and opposite spring forces supplied by the suspensions 130. During non-operation, each flying MO head is maintained statically in a storage condition away from the surface of the MO disc 107, typically on a ramp (not shown) adjacent to the disc surface. It is of course possible that the heads could be landed on the surface of the disc in a nondata storage region; however, such an approach would not be the optimum approach.

System 95 further includes a laser-optics assembly 96, an optical switch or microswitch 104 coupled to assembly 96 by at least one input light carrying element or optical fiber 98, and a plurality of sets of single mode polarization maintaining (PM) optical fibers 97. In the exemplary embodiment, each set of single mode PM optical fibers or output light carrying elements 97 are coupled through a respective one of the set of actuator arms 105 and suspensions 130 to a respective one of the set of flying MO heads 106. Accordingly, at least six sets of two PM optical fibers 97 each are optically coupled at one end to optical switch 104. Each such set of PM optical fibers 97 is coupled at the other end to a set of two flying MO heads 106. It should be appreciated than only an exemplary number of PM optical fibers are shown in the drawings. A controller 111 is electrically coupled to optical switch 104 by means of wires 112 for providing electrical command signals to the optical switch. The controller 111 can be any conventional type and includes an input for receiving one or more control signals, a series of amplifiers and voltage generators for each of the actuators and comb drive assemblies described below, an optional mechanism for sensing the position of the comb drive assemblies and an output for transmitting an output signal.

Figure 2:
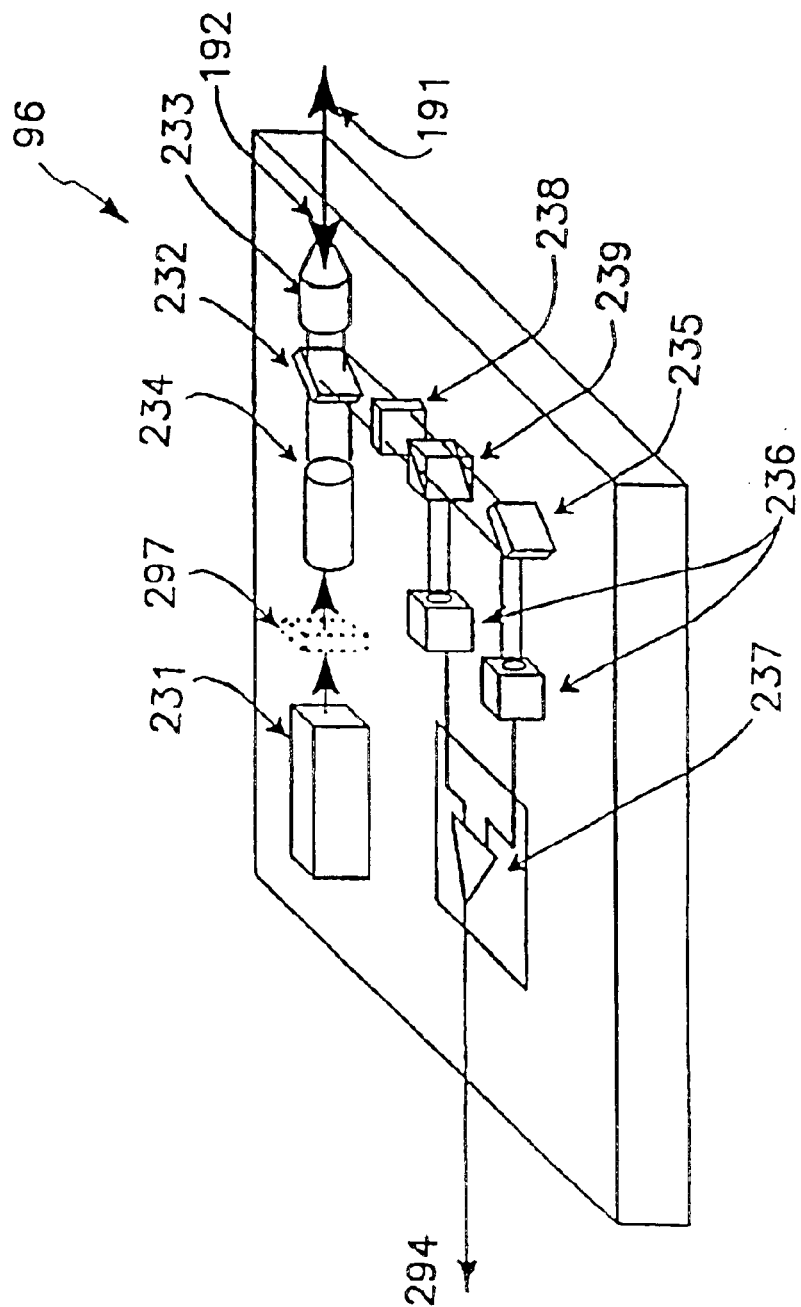
FIG. 2 is a view of a laser-optics assembly of the magneto-optical data storage and retrieval system of FIG. 1.

FIG. 2 is a diagram showing the laser-optics assembly 96 of the magneto-optical data storage and retrieval system of FIG. 1. As will now be explained with respect to FIGS. 2 and 3, reading and storing information on the surface of each disc 107 requires both conveying the output of a laser through a fiber-optic to the flying head so that the light output is accurately imaged on the surface of the disc and generating a magnetic field utilizing a coil which is supported on the flying head 106 near to the surface of the disc. The description of FIGS. 2 and 3 will briefly summarize the reasons for providing both a light source and a magnetic field to selectively access the data on the surface of the disc. In FIG. 2, the laser-optics assembly 96 is shown to include a linearly polarized diode laser source 231 operating in a visible or near ultraviolet frequency region and emitting an optical power sufficient for reading and writing using the set of MO discs 107. In a first embodiment, the laser diode source may be a RF modulated laser source. In a second embodiment, the linearly polarized laser source 231 may be a distributed feed-back (DFB) laser source. In an exemplary embodiment, the linearly polarized laser source 231 is selected to operate within a range of 635–685 nm; however, a laser source of other wavelengths could also be used. The laser-optics assembly 96 further includes: a collimating lens 234, a low wavelength dispersion leaky beam splitter 232, and a coupling lens 233. The laser-optics assembly-96 directs (from the linearly polarized laser source 231) a linearly polarized outgoing laser beam 191 (shown in FIG. 1) to the optical switch 104. The laser-optics assembly 96 further includes: quarter-wave plate 238, a mirror 235, a polarizing beam splitter 239 and a set of photodiodes or detectors 236. In the first embodiment, a linearly polarized laser beam 192 (shown in FIG. 1) reflected by a surface 108 of an MO disc 107 is directed by the optical switch 104 to the coupling lens 233, and is routed by the leaky beam splitter 232 to a differential detector comprising: the quarter-wave plate 238, the mirror 235, and the polarizing beam splitter 239. In the second embodiment, an optical isolator 297 is included between the laser source 231 and the collimating lens 234. As is well established in the art, this type of differential detection scheme measures the optical power in two orthogonal polarization components of the reflected laser beam 192, with a differential signal being a sensitive measure of polarization rotation induced by the Kerr effect at the surface of one of the set of MO discs 107. In both embodiments, after conversion by detectors 236, the differential signal is processed by the differential amplifier 237 for output as signal 294. The present invention is not meant to be limited to the aforementioned arrangement of optical elements and sources of light, as other techniques for directing the outgoing laser beam 191 and for detecting the reflected laser beam 192 are well known in the art.

Figure 3:
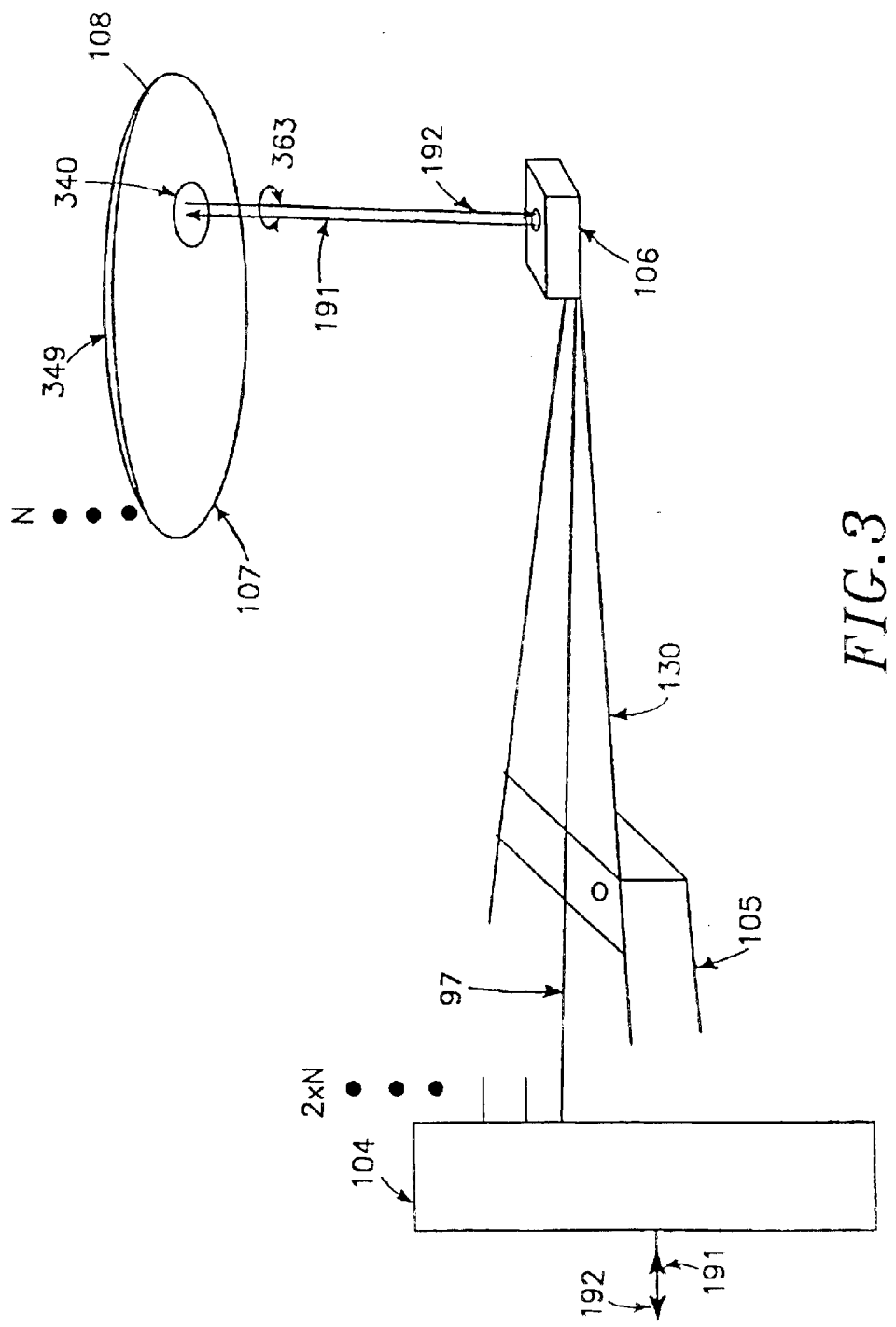
FIG. 3 is a view showing a representative optical path that includes the use of a laser source for use with the magneto-optical data storage and retrieval system of FIG. 1.

FIG. 3 is a diagram showing a representative optical path that includes the use of a DFB laser source. In a preferred embodiment, a representative optical path is shown in FIG. 3 to include: an optical switch 104, one of the set of single-mode PM optical fibers 97, and one of the set of flying MO heads 106. The optical switch 104, as more fully discussed below, provides sufficient degrees of selectivity for directing the outgoing laser beam 191 (with reference to laser source 231) to enter a respective proximal end of a respective single-mode PM optical fiber 97. The outgoing laser beam 191 is further directed by the single-mode PM optical fiber 97 to exit a respective distal end so as to pass through the flying MO head 106 onto a recording/storage layer 349 underlying each surface 108 of a respective MO disc 107.

Outgoing laser beam 191 is provided by any suitable laser source and is preferably provided by a linearly polarized laser source 231 that is a distributed feed-back (DFB) laser source.

During writing of information, the outgoing laser beam 191 is selectively routed by the optical switch 104 to the MO disc 107 so as to lower a coercivity of the recording/storage layer 349 by heating a selected spot of interest 340 to approximately the Curie point of the recording/storage layer 349. Preferably, the optical intensity of outgoing laser beam 191 is held constant, while a time varying vertical bias magnetic field is used to define a pattern of "up" or "down" magnetic domains perpendicular to the MO disc 107. This technique is known as magnetic field modulation (MFM). Subsequently, as the selected spot of interest 340 cools, information is encoded within the recording/storage layer 349 of the respective spinning disc 107.

During readout of information, the outgoing laser beam 191 (at a lower intensity compared to writing) is selectively routed to the MO disc 107 such that at any given spot of interest 340, the Kerr effect causes (upon reflection of the outgoing laser beam 191 from the recording/storage layer 349) a reflected laser beam 192 to have a rotated polarization of either clockwise or counter clockwise sense 363 that depends on the magnetic domain polarity at the spot of interest 340.

The aforementioned optical path is bi-directional in nature. Accordingly, the reflected laser beam 192 is received through the flying MO head 106 and enters the distal end of the single-mode PM optical fiber 97. The reflected laser beam 192 propagates along the single-mode PM optical fiber 97 to exit at its proximal end and is selectively routed by the optical switch 104 for transmission to laser-optics assembly 96 for subsequent conversion to the signal 294.

FIGS. 4a–4g are diagrams showing the flying magneto-optical head of the magneto-optical data storage in a perspective, a side cross-sectional, an expanded cross-section, a side, a front, a bottom, and a rear view, respectively. In FIG. 4a, the flying MO head 106 is shown for use above a recording/storage layer 349 of one of the set of MO discs 107. The flying MO head 106 includes: a slider body 444, an air bearing surface 447, a quarter-wave plate (not shown), a reflective substrate 400, objective optics 446, a magnetic coil 460, and a yoke 462. The slider body 444 is dimensioned to accommodate the working distances between the objective optics 446, the single-mode PM optical fiber 97, and the reflective substrate 400. The reflective substrate 400 may include a reflective surface which is aligned so as to direct the outgoing laser beam 191 and 192 to, and from the recording/storage layer 349. Although slider body 444 may include industry standard "mini", "micro", "nano", or "pico" sliders, alternatively dimensioned slider bodies 444 may also be used (as determined by the aforementioned dimensional constraints of the elements used with the flying MO head 106). Accordingly, in the preferred embodiment, the slider body 444 comprises a mini slider height (889 μm) and a planar footprint area corresponding to that of a nano slider (1600×2032 μm).

The single-mode PM optical fiber 97 is coupled to the slider body 444 along an axial cutout 443, and the objective optics 446 is coupled to the slider body 444 along a vertical corner cutout 411. Although in the preferred embodiment the axial cutout 443 is located along a periphery of the slider body, and the vertical cutout 411 is located at a corner of the slider body 444, the axial cutout 443 and the vertical cutout 411 may be located at other positions on the flying MO head 106, for example, between the periphery and a central axis or, alternatively, along the central axis itself. Positioning the optical fiber 97 and the objective optics 446 at other than along a central axis may function to affect a center of mass of the magneto-optical head 106 and, thus, its flying dynamics. Accordingly, the point of attachment of the flying MO head 106 to the suspension may require adjustment to compensate for off-center changes in the center of mass of the magneto-optical head 106. Preferably, the cutouts 443 and 411 may be designed as channels, v-grooves, or any other suitable means for coupling and aligning the single-mode optical fiber 97 and objective optics 446 to the flying MO head 106. In the preferred embodiment, the laser beams 191 and 192 traverse an optical path (to and from the recording/storage layer 349 of the MO disk 107) that includes: the single-mode PM optical fiber 97, the reflective substrate 400, the quarter-wave plate 493, and the objective optics 446. In the preferred embodiment, the single-mode PM optical fiber 97 and the objective optics 446 are positioned within their respective cutouts to achieve focus of the outgoing laser beam 191 within the spot of interest 340 (see FIG. 3) as a focused optical spot 448. The single-mode PM optical fiber 97 and the objective optics 446 may be subsequently secured in place by using ultraviolet curing epoxy or similar adhesive.

With respect to the present invention, attention is especially directed to FIGS. 4c and 4b. These two figures show the objective optics 446 which are used to focus the optical spot in a defined size 448 on the surface 349 of the disc. The spot is focused through a yoke 462 and low profile magnetic coil 460 which are incorporated in support structure 461 and mounted on the bottom of the flying MO head or on or near the surface of the objective optics 446, without interfering with the aerodynamic flying qualities of the flying MO head 106.

Figure 5:
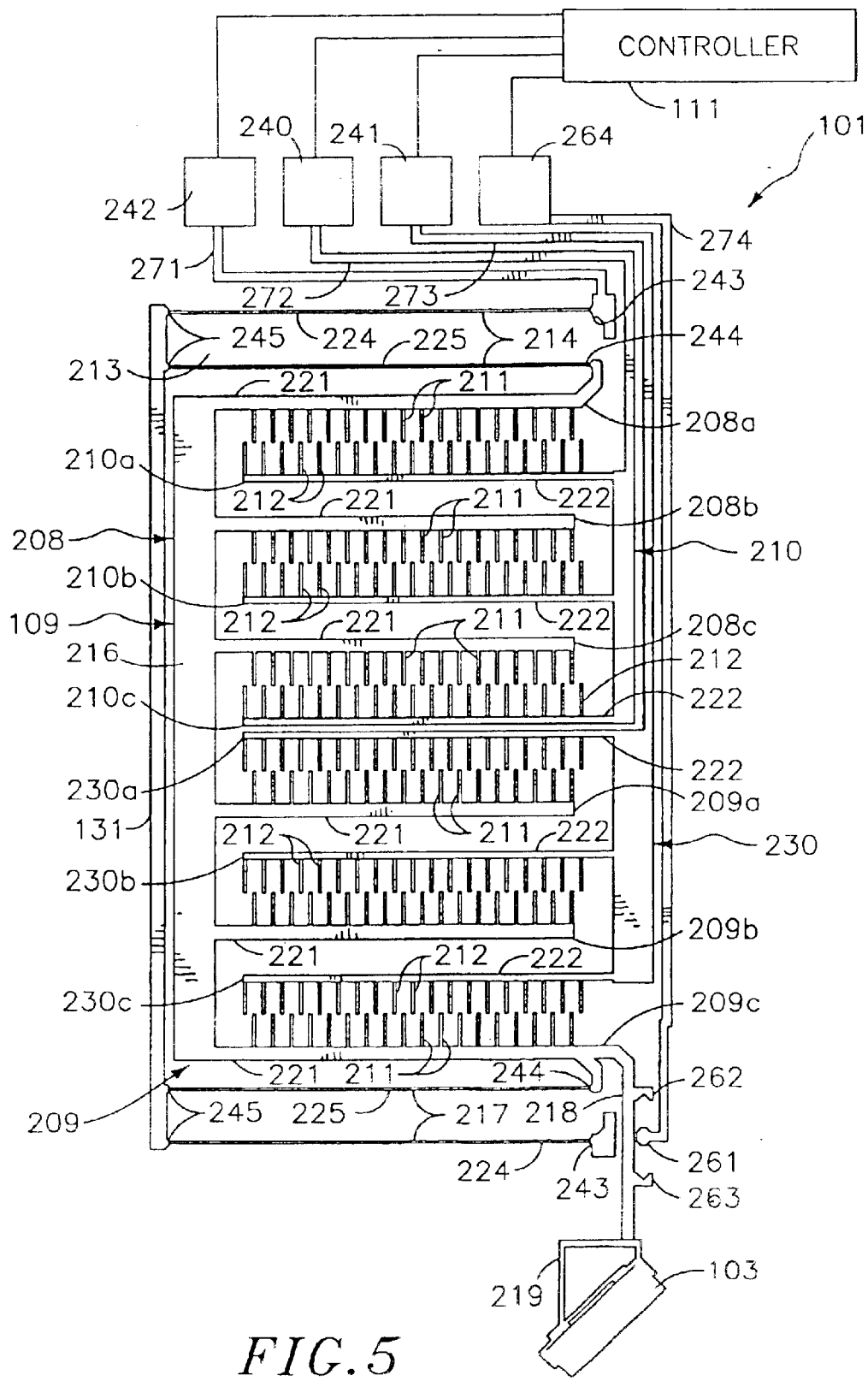
FIG. 5 is an enlarged plan view of an embodiment of an electrostatic microactuator for use in the optical microswitch of the present invention.

The optical switches or microswitches of the present invention utilize microactuators to translate optical mirrors. Each of the microactuators in such a microswitch or other application includes at least one pair of opposed comb drive members to provide motive force for the actuator. A somewhat simplified version of a lateral comb drive actuator or microactuator 101 for use in an optical microswitch such as microswitch 104 is illustrated in FIG. 5, which represents a top plan view of the actuator 101. Shuttle 109 of the actuator 101 includes first and second movable electrode assemblies 208, 209 which are joined together so as to move together in unison. Actuator 101 further includes and first and second separate fixed assemblies 210, 230. The assemblies extend perpendicularly to the longitudinal centerline of the actuator 101 and are centered on such centerline. First movable assembly 208 comprises first, second, and third comb drive members 208a, 208b, 208c each of which extends perpendicularly to the direction of travel of the assemblies 208, 209. Second movable assembly 209 comprises first, second, and third comb drive members 209a, 209b, 209c each of which extends perpendicularly to the direction of travel of the assemblies 208, 209. Actuator 101 and movable assemblies 208, 209 and fixed assemblies 210, 230 thereof are made from a silicon wafer by any suitable means such as by DRIE in which a thin, single-crystal silicon layer, fusion bonded to substrate 213 in certain areas, is etched to form movable assemblies 208, 209 and fixed assemblies 210, 230. The single-crystal silicon layer is electrically isolated from the substrate 213 by a thick silicon dioxide layer. As such, movable electrode assemblies 208, 209 are electrically isolated from fixed electrode assemblies 210, 230. Alternative fabrication techniques include high aspect ratio plating of metallic structures on an insulating substrate over localized sacrificial layers. Such a process is described in U.S. Pat. No. 5,450,751 titled "Microstructure For Vibratory Gyroscope" by Putty and Eddy. The resulting structures include relatively narrow and tall suspended spring structures, fixed attachment points to a substrate, and the ability to make electrical connections to the structures. Alternatively, the desired structures can be fabricated by the deposition, patterning, and etching of a relatively thick layer of for example polysilicon over localized sacrificial layers of for example doped silicon dioxide. An example of such a process is described in "Thick Polysilicon Based Surface Micromachined Capacitive Accelerometer with Force Feedback Operation" by B. Wenk, et al., in the SPIE Proceedings, Volume 2642 titled "Micromachined Devices and Components," October, 1995, pp. 84–94.

Movable electrode assemblies 208, 209 are interconnected by a rigid, elongate frame-member or connector bar 216 which extends longitudinally in the direction of travel. First movable electrode assemblies 208 are joined to one end portion of the connector bar 216 in longitudinally spaced apart positions and second movable electrode assemblies 209 are joined to the opposite or other end portion of the connector bar 216 in longitudinally spaced apart positions. An extension 218 and a bracket member or bracket 219 are included within the attachment means of the actuator 101 for rigidly attaching mirror 103 to shuttle 109 and thus to movable electrode assemblies 208, 209. The bracket 219 and thus mirror 103 are inclined at an angle to the direction of travel of shuttle 109 and movable electrode assemblies 208, 209.

Each of the comb drive members 208a, 208b, 208c, 209a, 209b, 209c has a bar or beam 221 which is joined to the connector bar 216 at one end and extends perpendicularly from the bar across the actuator. Each bar 221 has a length ranging from 200 to 2000 microns, preferably ranging from 700 to 1200 microns and more preferably approximately 800 microns which defines the length of the respective comb drive member. A plurality or series of comb-like members or fingers 211 of equal length extending parallel to the direction of travel are secured to each bar 221. Fingers 211 are evenly spaced-apart along the length of each comb drive bar 221 and each have a length ranging from 5 to 200 microns, preferably ranging from 60 to 130 microns and more preferably approximately 90 microns. Fingers 211 are spaced apart a distance ranging from 3 to 25 microns, preferably ranging from 6 to 15 microns and more preferably approximately 10 microns. The comb fingers 211 of comb drive members 208a, 208b, 208c extend toward the mirror 103 coupled to the actuator, while the comb fingers 211 of the comb drive members 209a, 209b, 209c extend away from the mirror.

First fixed electrode assembly 210 comprises first, second, and third comb drive members 210a, 210b, 210c and second fixed electrode assembly 230 comprises first, second, and third comb drive members 230a, 230b, 230c each of which comb drive assembly extends perpendicularly of the direction of travel of movable electrode assemblies 208, 209. Each of the comb drive members 210a, 210b, 210c, 230a, 230b, 230c has a bar or beam 222 mounted on substrate 213 and extending across the actuator 101. Each bar 222 has a length similar to the length of bar 221 which defines the length of the respective comb drive member. A plurality or series of comb-like members or fingers 212 substantially identical in size and shape to comb drive fingers 211 are secured to comb drive bar 222 in spaced-apart positions along the length of the bar 222. The comb fingers 212 of comb drive members 210a, 210b, 210c extend away from mirror 103 and oppose the comb drive fingers 211 of comb drive members 208a, 208b, 208c while the comb fingers 212 of comb drive members 230a, 230b, 230c extend toward the mirror and oppose the comb drive fingers 211 of comb drive members 209a, 209b, 209c.

Figure 6:
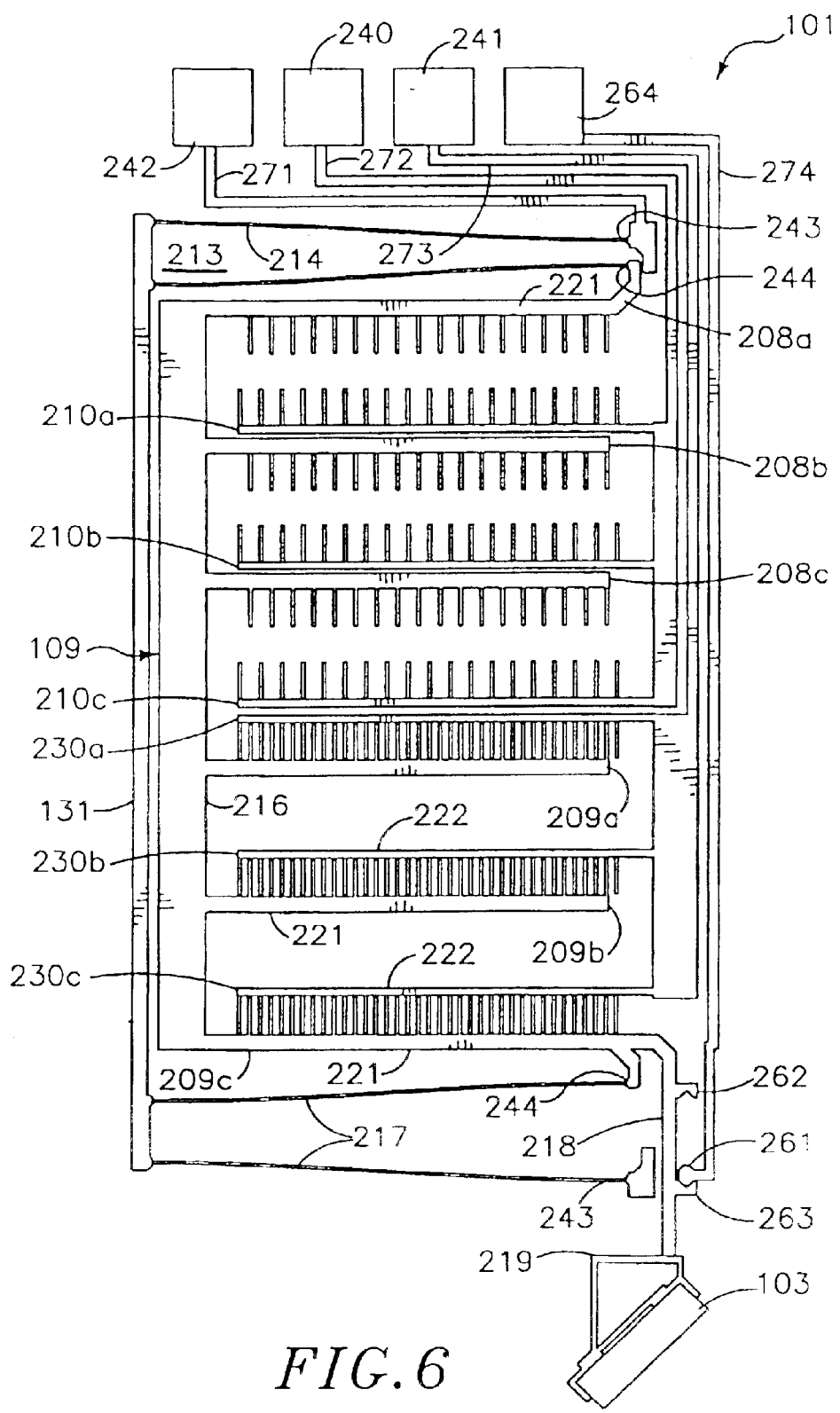
FIG. 6 is a plan view of the electrostatic microactuator of FIG. 5 in which the mirror therein is in a retracted condition.
Figure 7:
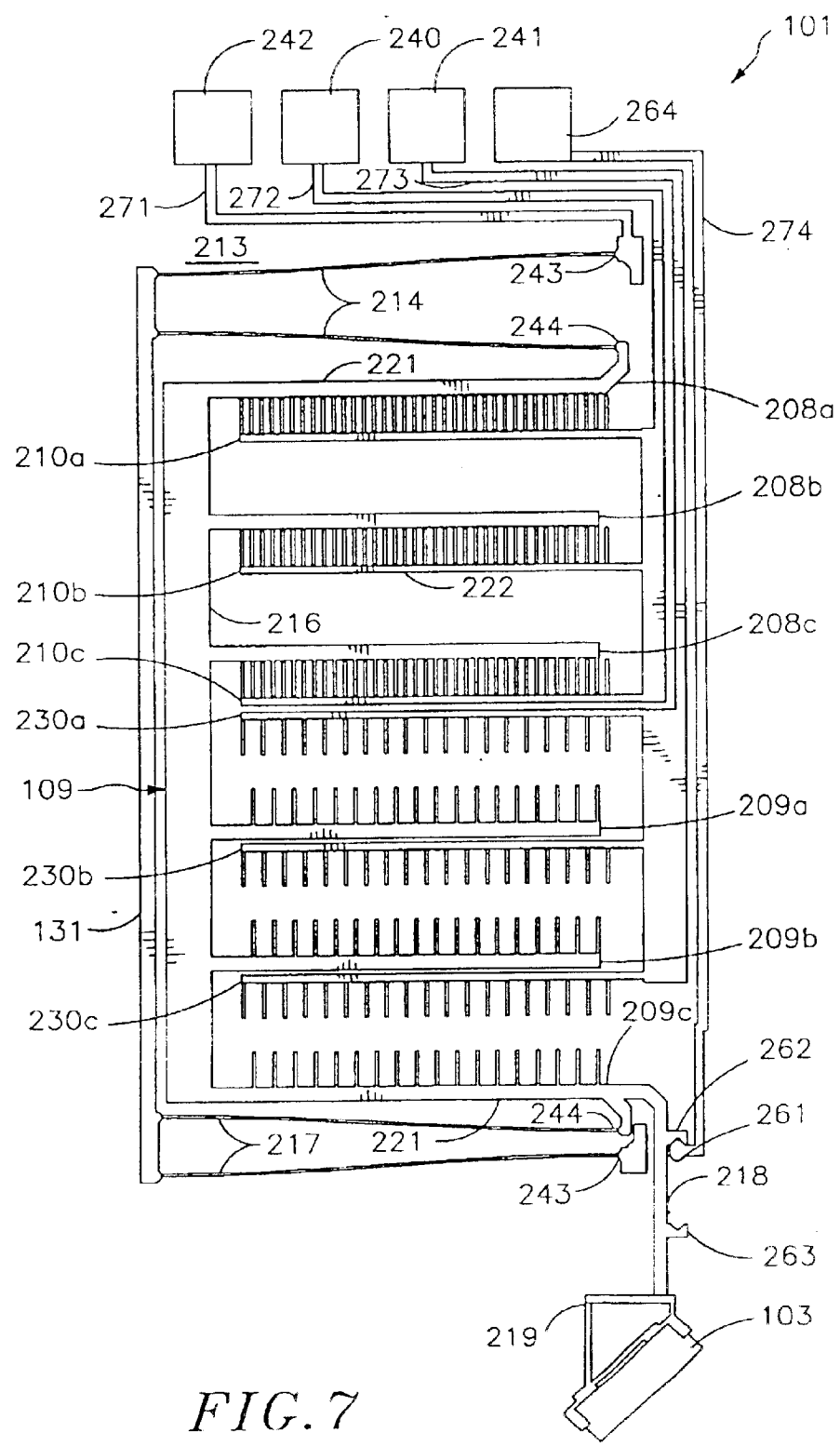
FIG. 7 is a plan view of the electrostatic microactuator of FIG. 5 in which the mirror therein is in an extended condition.

Comb drive fingers 211 are interleavably disposable within fingers 212. Each opposed set of comb drive members of actuator 101 form an electrostatically-driven comb drive means or assembly. The comb drive members 208a, 208b, 208c, 209a, 209b and 209c of each such comb drive assembly are movable relative to respective comb drive members 210a, 210b, 210c, 230a, 230b and 230c between a first position, as shown in FIG. 6 with respect to comb drive members 208a, 210a, 208b, 210b and 208c, 210c, in which the respective comb drive fingers are spaced apart from each other, to a second position, as shown in FIG. 5 with respect to comb drive members 208a, 210a, 208b, 210b, 208c, 210c, 209a, 230a, 209b, 230b and 209c, 230c, in which the comb drive fingers 211, 212 are not interdigitated but nonetheless in electrostatic engagement when a voltage potential is applied therebetween, and to a third position, as shown in FIG. 7 with respect to comb drive members 208a, 210a, 208b, 210b and 208c, 210c, in which the respective comb drive fingers are both interdigitated with respect to each other and in electrostatic engagement. The free ends of the comb drive fingers 211, 212 end substantially along a line extending perpendicular to the direction of travel of shuttle 109 when the opposed comb drive members are in the second position. The spacing between the fingers 211, 212 is chosen to ensure lateral stability over the full range of deflection at the largest allowed driving voltage for the actuator 101.

The fixed assemblies 210, 230 are each fixedly attached to substrate 213 and are used to drive the first and second movable electrode assemblies 208, 209 between a first or retracted position, shown in FIG. 6 in which first comb drive members 208, 210 are in a spaced apart position and second comb drive members 209, 230 are in an interdigitated position, and a second or extended position, shown in FIG. 7 in which first comb drive members 208, 210 are in an interdigitated position and second comb drive members 209, 230 are in a spaced apart position.

Shuttle 109 and movable electrodes assemblies 208, 209 are suspended over the substrate 213 by a set of springs or folded cantilever beams 214, 217 disposed at each end of the electrode assemblies 208, 209. Spring 214 is spaced apart from first comb drive member 208a at one end of actuator 101 and spring 217 is spaced apart from second comb drive member 209c at the opposite other end of actuator 101. Each set of springs 214, 217 includes first and second spaced-apart spring portions 224, 225 which extend perpendicularly of the direction of travel when in a relaxed position and are joined at one end by a folded portion 245 (see FIG. 5). The spring portions or beams 224, 225 extend, in a spaced apart relationship, along substantially the entire length of comb drive bars 221, 222 and are parallel to the comb drive bars. The spring portions 224, 225 each have an identical cross section, which is substantially rectangular. One end of rigid support or elongate support bar 131 is joined to the folded portion 245 of each of springs 214, 217. First ends 243 of each of springs 214, 217 are joined to substrate 213 while second ends 244 of the springs 214, 217 are joined to the respective ends of comb drive bars 221 for comb drive members 208a, 209b opposite connector bar 216.

The suspended portion of actuator 101, which is designed using high aspect ratio techniques and includes movable electrode assemblies 208, 209, shuttle 109, springs 214, 217 and rigid support 131, has a height, measured out of the plane of substrate 213, ranging from 20 to 300 microns, preferably ranging from 60 to 150 microns and more preferably approximately 80 microns.

Electrical connector means are included in actuator 101 for permitting a controller 111 to be electrically coupled to movable electrode assemblies 208, 209 and fixed electrode assemblies 210, 230. Specifically, electrical connector means in the form of electrical pads 240, 241, 242 are provided. Electrical pad 242 is electrically coupled to first and second movable electrode assemblies 208, 209 by lead means in the form of lead or trace 271. Electrical pads 240, 241 are electrically coupled to first fixed electrode assembly 210 and second fixed electrode assembly 230 by respective lead means in the form of leads or traces 272, 273.

In the present invention, the springs preferably exhibit a high ratio of lateral to forward spring constant. In the prior art this is accomplished by using four opposing springs, or folded cantilever beams, disposed at four corners of a symmetrical movable electrode portion (see FIG. 1 in U.S. Pat. No. 5,025,346). However, in this prior art design, as the movable electrode portion is deflected, the lateral stiffness of the springs decreases dramatically.

The present invention identifies that the bilateral symmetry and four springs of the prior art actuator designs are not required. In contrast, the present invention includes only the two springs or folded cantilever beams 214, 217, which are coupled at first ends 243 to the substrate 213 and at second ends 244 to the movable electrode assemblies 208, 209. The springs are connected at their folded portions 245 by a suspended rigid support 131 extending therebetween. The aforementioned structures are designed to be fabricated using high aspect ratio techniques such as DRIE, permitting them to be designed with a taller height or profile than the prior art. The significantly larger height and the rectangular cross section of spring portions 224, 225 enable springs 214, 217 to exhibit increased out-of-plane stiffness, that is stiffness out of the plane of substrate 213, over that of the prior art. Such out-of-plane stiffness serves to inhibit undesirable bending of movable electrode assemblies 208, 209 out of the plane of fixed electrode assemblies 210, 230, despite the movable electrode assemblies being anchored to substrate 213 only at ends 243 of springs 214, 217.

Actuator 101 has means for restricting the forward and rearward movement of shuttle and for permitting controller 111 to monitor the position of shuttle 109 and specifically to monitor whether the shuttle is in its fully retracted position shown in FIG. 6 or fully extended position shown in FIG. 7. A mechanical stop 261 is rigidly formed on substrate and is disposed between a first or forward limiter 262 and a second or rearward limiter 263 provided on extension 218. The forward movement of shuttle 109 is restricted by the engagement of stop 261 with forward limiter 262 and the rearward movement of the shuttle 109 is restricted by the engagement of the stop with rearward limiter 263. Stop 261 is electrically connected by means of a lead or trace 274 formed on substrate 213 to an electrical pad 264 also formed on the substrate 213. Pad 264 permits stop 261 to be electrically coupled to controller 111. The engagement of stop 261 with one of limiters 26g or 263 closes an electrical circuit between pad 264 and pad 242.

In one method of operating the actuator 101 of the present invention, a voltage relative to a potential applied to the electrical pad 242 may selectively applied by controller 111 through a set of respective electrical pads 240 or 241 in actuator 101 to the comb fingers 212 of the fixed electrode assembly 219 or 230 to statically deflect the movable electrode assemblies 208, 209 and therefore the extension 218 and associated mirror 103 of the actuator 101 between the retracted position shown in FIG. 6 and the extended position shown in FIG. 7. The electrostatic attraction force between the engaging comb drive members is approximately constant through interdigitation.

The extended condition may be achieved in the actuator 101 by releasing the constant voltage on the fixed electrode assembly 230 so that the mirror 103 swings towards the extended position against forward limiter 262. The mirror 103 is held in the extended position 293 by thereafter applying a constant voltage to the other fixed electrode assembly 210. Subsequently, the mirror 103 may be retracted by removing the constant voltage on the fixed electrode assembly 210 and by reapplying the fixed voltage to the fixed electrode assembly 230.

During each half-stroke of shuttle 109, the shuttle is first pulled by springs 214, 217 from its deflected position back to its relaxed position, shown in FIG. 5, and thereafter pulled by the cooperative electrostatic engagement between either electrode assemblies 208, 210 or 209, 230 to its other deflected position.

The performance of the lateral comb actuator 101 depends on a number of factors including: the forward and side stiffness of the springs 214, 217 and the relative dimensions of the comb drive fingers 211, 212. A performance trade-off exists between the allowed operating voltage and the size of the actuator 101 and the resulting displacement and switching speed of the mirror 103. The traditional method for achieving large deflections with low operating voltages has been to minimize the spacing between electrodes to generate the largest forward force and use springs with a low forward stiffness to produce a large forward displacement. This approach is commonly used for thin polysilicon actuators where the low out of plane stiffness prevents the use of large operating voltages. However, these designs are not optimal when relatively thicker structures are used. Although the forward force per finger is increased when the spacing between electrodes is reduced, the lateral forces increase faster. When designing a high speed actuator for either large deflection or high force, the preferred design approach is to determine the maximum voltage that can be supported by the structure and then choose an electrode spacing that results in the minimum lateral instability at that maximum voltage. The maximum displacement and speed of the actuator are then defined by the spring stiffness and the mass of the moving elements.

The present invention addresses the aforementioned concerns while also minimizing the size of the actuator and thus the space occupied by actuators on the optical microswitch 104. In the prior art, the comb fingers are not sufficiently constrained to prevent movement parallel relative to the central axis of the microswitch 104, that is perpendicular to the direction of travel of the actuator 101, such that a sufficient side force generated between the fingers causes the movable electrode assembly to snap towards a side rather than continue towards the extended or retracted position. This instability occurs when the derivative of the side force with respect to side displacement is larger than the lateral mechanical spring constant of the springs.

Spring portions or beam-like members 224, 225 can be longer or shorter than comb drive bars 221, 222. More specifically, spring portions 224, 225 have a length ranging from 200 to 2000 microns and preferably ranging from 800 to 1200 microns and a width ranging from 3.5 to 5.5 microns and preferably ranging from 3.75 to 4.25 microns. The spring portions 224, 225 shown in FIG. 5 each have a length at least equal to the length of the comb drive bars 221, 222 of actuator 101. Actuator 101 has a length of approximately 800 microns, a width of approximately 2500 microns and a height of approximately 80 microns.

Beams or springs 214, 217 are shown in FIG. 5 in an undeflected or relaxed position in which each of the beam-like members or beams 224, 225 extends linearly in a direction perpendicular to the direction of travel of shuttle 109. Beams 224, 225 are each movable in one direction of travel of electrode assembly 209 to a first deflected position, shown in FIG. 6, when the respective mirror 103 is in a retracted position. Beams 214, 217 are also movable in an opposite direction of travel of electrode assembly 209 to a second deflected position, shown in FIG. 7, when the respective mirror 103 is in an extended position. The beams 214, 217 are in a nonlinear or bent position when in their respective first and second deflected positions. More specifically, the opposite ends of each beam 224, 225 are moved in opposite directions, each such direction being parallel to the direction of travel of shuttle 109, when the respective spring 214, 217 is moved from a linear or relaxed position to a deflected or bent position. Maximum side stiffness of the beams or springs 214, 217, that is stiffness in the direction perpendicular to the direction of travel of shuttle. 109, occurs with the springs in their undeflected or relaxed positions shown in FIG. 5 midway between the retracted and the extended positions shown respectively in FIGS. 2 and 3. As can be seen, springs 214, 217 are in a linear condition when undeflected as in FIG. 5.

Shuttle 109 composed of trussed frame 216 further increases the overall rigidity of the actuator 101 against lateral loads and flexure and reduces the total mass of shuttle log. The inherent stiffness of the present invention eliminates the need for designing the actuator 101 with bilateral symmetry as used in the prior art, permitting the width of the actuator 101 to be reduced nearly by half. With a reduced width, the set of actuators 101 may be packed more closely together in microswitch 104 so as to allow a greater number of actuators in the microswitch over a given length of laser beam 191.

Figure 8:
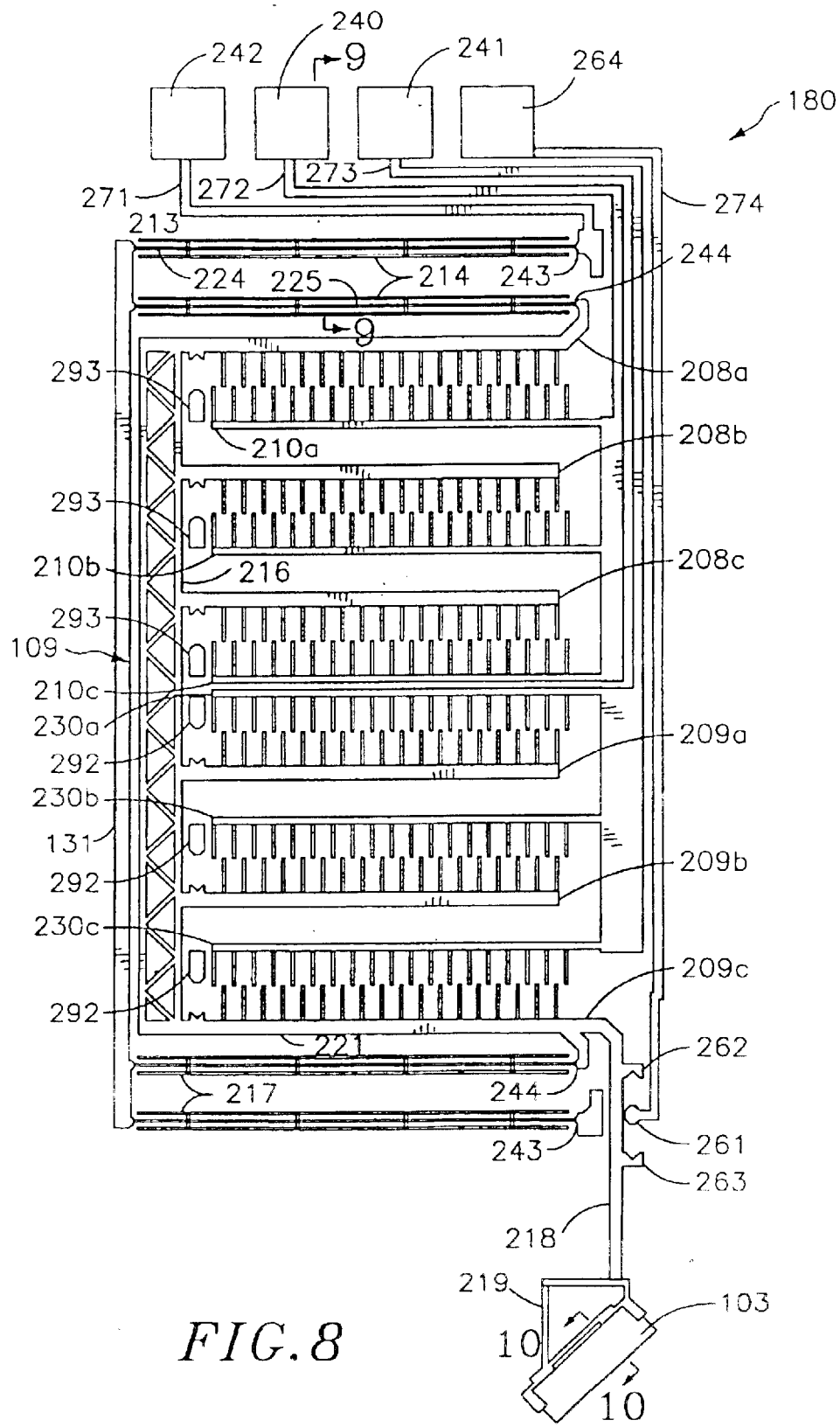
FIG. 8 is a plan view of another embodiment of an electrostatic microactuator for use in the optical microswitch of the present invention.

A further embodiment of the actuator of the present invention including additional features to improve the performance of the actuator is shown in FIG. 8. Like reference numerals have been used to describe like components in actuator 101 and actuator 180 of FIG. 8. Actuator 180 includes first and second sacrificial bars 246 and 247, shown in FIGS. 4 and 5 with respect to spring 214, provided alongside each spring or beam portion 224, 225 to ensure even etching and thus the desired rectangular cross-section of the beam portions. Each of the sacrificial bars has a height approximating the height of the adjoining beam portion and provides a narrow slot 248 along each side of the beam portion. The spacing between the beam portion and the respective sacrificial bars, that is the width of each slot 248, is comparable to the smallest etched feature in the device. In actuator 180, the spacing between the beam portion and each of the sacrificial bars is approximately eight microns. The sacrificial bars 246, 247 facilitate formation of parallel, planar side surfaces 226, 227 by limiting retrograde etching of the side surfaces 226, 227. More specifically, the narrow width of slots 248 inhibits ions other than those traveling in a direction parallel to the slot from entering the slot and thus participating in the etch of side surfaces 226, 227.

In an exemplary method of operation of the actuator 180, the first and second movable electrode assemblies 208, 209 of the actuator 101 are initially static and midway between an extended and retracted position as shown in FIG. 8. In the extended position, the extension 218 abuts forward limiter 262 and first and second movable electrode assemblies 208, 209 abut against at least one and as shown in FIG. 8 a plurality of three first fixed stops 293 attached to substrate 213. A stop 293 is provided for each of comb drive members 208a, 208b, and 208c. The stop 261 engages forward limiter 261 attached to extension 218. In a retracted position, the extension 218 abuts rearward limiter 263 and first and second movable electrode assemblies 208, 209 abut against at least one and as shown in FIG. 8 a plurality of three second fixed stops 292 attached to the substrate 213. A stop 292 is provided for each of comb drive members 209a, 209b, 209c. The stop 261 engages rearward limiter 263 attached to extension 218. The stops 292, 293 facilitate repeatability in the position of mirror 103 in optical microswitch 104.

Figure 9:
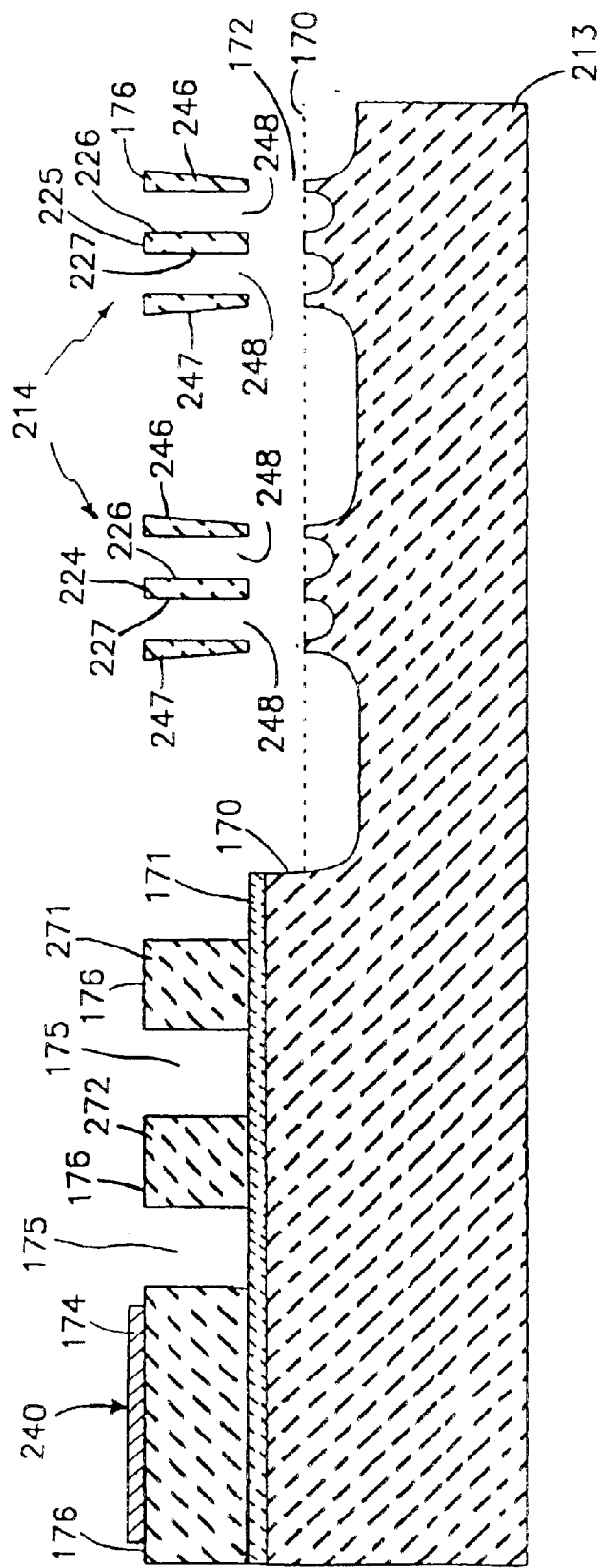
FIG. 9 is a cross-sectional drawing of the electrostatic microactuator of FIG. 8 taken along the line 9—9 of FIG. 8.

The actuators 101 and 180 may be fabricated using a process similar to that described in a paper entitled, "Silicon Fusion Bonding And Deep Reactive Ion Etching; A New Technology For Microstructures" by Klassen, Petersen, Noworolski, Logan, Maluf, Brown, Storment, McCully, and Kovacs, in the Proceedings Of Transducers '95 (1995), pages 556–559 in which shallow cavities in a bottom silicon wafer or substrate 213 allow for the creation of suspended or movable springs 214, 217, comb drive members 208, 209 and the like. As shown in FIG. 9, shallow depressions 170 having a depth between 5 and 50 microns and more preferably 10 microns are etched in the bottom wafer or substrate 213 in areas where moving structures are desired. A second or top wafer 173 is fusion bonded to the substrate 213 using a silicon dioxide layer 171 between 0.1 and 2.0 microns thick and more preferably approximately 1.0 microns thick. The top wafer 173 may then be lapped and polished to a desired thickness. A metal layer 174 is created on the top surface 176 of the top wafer for use in electrical pads 240, 241, 242, 264, visual indicators, and the like. Finally the top wafer 173 is etched using deep reactive ion etching techniques to achieve the desired high aspect ratio structures. The final DRIE silicon etch terminates on the silicon dioxide layer 171 where present and continues etching into the substrate 213 where layer 171 is absent. This process creates movable single-crystal silicon structures such as springs 214, 217, movable electrode assemblies 208, 209, rigid support 131 and connector 20 truss 216 that are suspended above the substrate 213 and electrically isolated from the substrate by an air gap 172 having the thickness of the shallow cavity 170. Additional structures such as lead means 286, 287 and stops 292, 292 are fixedly attached to substrate 213 but electrically isolated from the substrate by the silicon dioxide layer 171 and from surrounding features by air gap 175.

In some applications such as switching, independent verification of the position of the mirror 103 is important. When mirror 103 in actuator 180 is in the extended position, forward limiter 262 of the movable electrode portion 208 is in engagement and electrical contact with stop 261. The stop 261 is electrically coupled by lead 274 to electrical pad 264, which can be electrically coupled to controller 111. Similarly, when the mirror 103 is held in the retracted position, rearward limiter 263 is in engagement and electrical contact with stop 261 and thus electrically coupled by lead 274 to electrical pad 264. Thus, the position of movable electrode assembly 208, shuttle 109 and mirror 103 can be sensed electrically by controller 111 to confirm and/or monitor the state of microswitch 104. Limiters 262, 263 and stops 261, 292, 293 are included in the travel stop means of actuator 180.

Other means for monitoring the position of shuttle 109 and movable electrode assemblies 208, 209 can be provided in the actuators of the present invention. For example, controller 111 can determine the position of movable comb drive members 208a, 208b, 208c and 209a, 209b, 209c by means of a conventional algorithm included in the controller for measuring the capacitance between comb drive fingers 211 of the movable comb drive members and comb drive fingers 212 of the cooperatively interengaging stationary comb drive members 210a, 210b, 210c, 230a, 230b, 230c. For example, a signal separate from the drive signal to comb drive members can be transmitted by controller 111 to the actuator for measuring such capacitance. Such a method does not require physical contact between electrodes such as the travel stop means described above. Alternatively, the silicon material along the first and second opposite, vertical sides of one or more of the spring portions or suspensions 224, 225 can be doped during formation of the actuator to create piezoresistors in the spring portions. The change in electrical resistance of the piezoresistors, corresponding to changes in the strain of suspensions 224, 225 during deflection of springs 214, 217, can be measured by a conventional algorithm provided in controller 111 to determine the position of the shuttle 109 and mirror 103 relative to the substrate 213 and the fixed electrode assemblies 210, 230.

Actuator 601, a further embodiment of the actuator of the present invention shown in FIG. 11, is substantially similar to actuator 101 and like reference numerals have been used to describe like components of actuators 101 and 601. As in actuator 101, actuator 601 includes first and second movable electrode assemblies 208, 209 which are joined together so as to move in unison together and first and second separate fixed electrode assemblies 210, 230. Electrode assemblies 208, 209, 210, 230 extend perpendicularly to the longitudinal centerline of the actuator and are centered on such centerline. Actuator 601 differs from actuator 101 in that first movable assembly 208 comprises only first comb drive member 208a extending perpendicularly to the direction of travel of the assemblies 208, 209. Second movable assembly 209 comprises only first comb drive member 209a extending perpendicularly to the direction of travel of the assemblies 208, 209. As actuator 601 contains only single comb drive members 208a, 209a while actuator 101 contains comb drive members 208a, 208b, 208c, 209a, 209b, 209c, actuator 101 provides approximately three times the motive force of actuator 601. The design of the suspension for actuator 601 must account for this reduction in force in order to achieve the required deflection. The use of a single pair of comb drive assemblies 208, 209 reduces the total length of actuator 601 which will allow for more compact optical microswitches, as will be described later.

Figure 12:
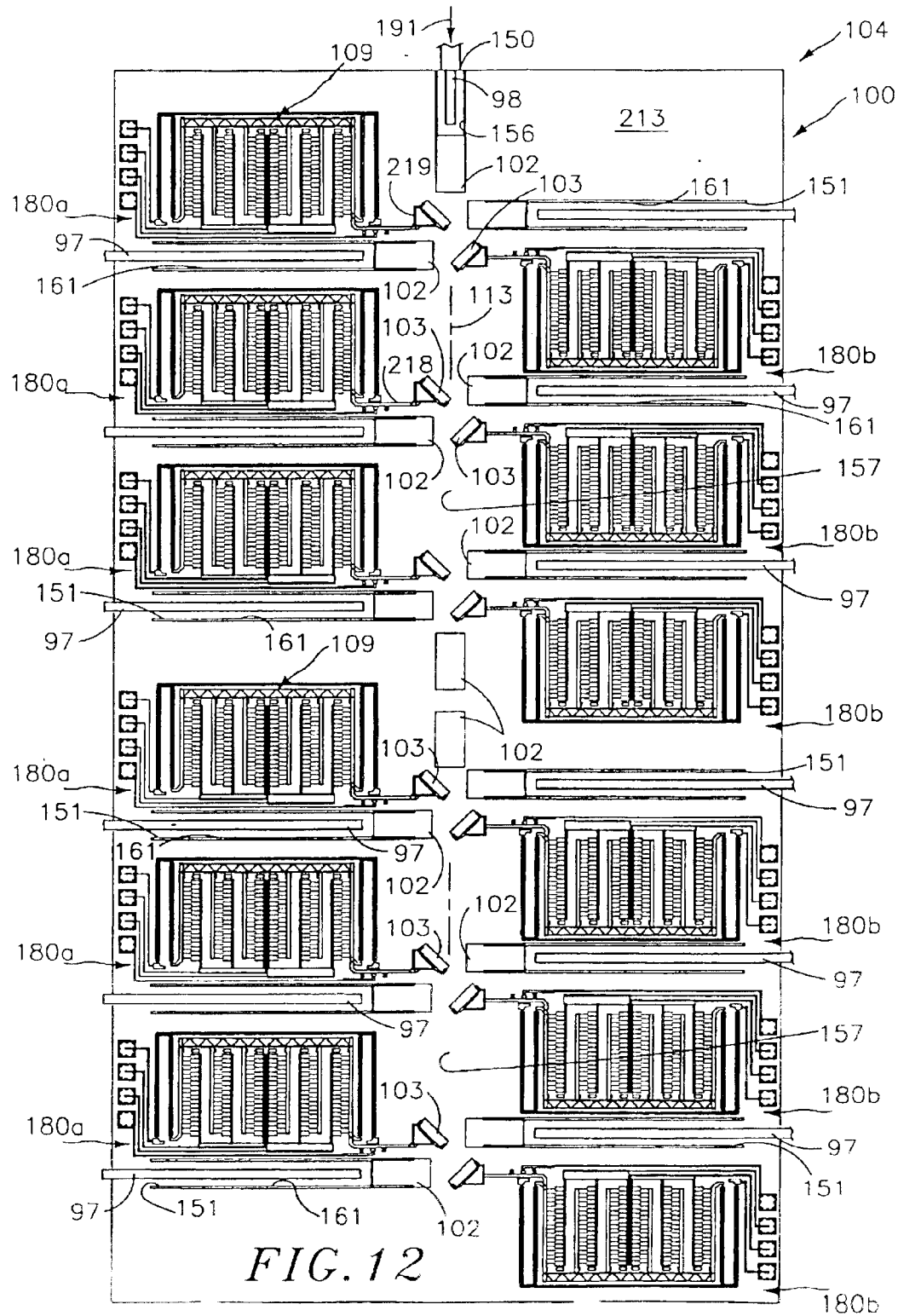
FIG. 12 is a plan view of an optical microswitch of the present invention in an as fabricated or prior to operation condition.

A top plan view of a first embodiment of an optical switch 104 as fabricated according to the present invention is shown in FIG. 12. The switch 104 includes a substantially planar assembly or apparatus in the form of a microchip 100 comprising at least one and as shown a series or plurality of twelve lateral comb drive actuators 180 carried by a silicon wafer or substrate 213 having a thickness of approximately 500 microns. Each of the electrostatically-driven actuators or motors 180 has a shuttle means or shuttle 109 coupled to a mirror 103 disposed vertically relative to substrate or body 213. A laser beam 191 carried by input fiber 98 is directed through an input or inlet port 150 of the switch 104 and through a collimation lens 102 before continuing in a path down a central longitudinal axis 113 of the switch 104. A typical laser beam 191, 192 for use with optical switch 104 can have a diameter ranging from approximately 100 to 200 microns. As shown in FIG. 12, the jacket of input fiber 98 is removed at input port 150 and the clad fiber 98 thereafter extends into microchip 100 along an inlet groove 156 formed therein. A collimating lens 102 is disposed nearby the end of fiber 98. In the preferred embodiment shown in FIG. 12, lens 102 is a conventional miniature graded index collimating lens. Alternatively, lens 102 can be a conventional miniature molded lens or a conventional ball lens and be within the scope of the present invention. The end of fiber 98 is positioned in switch 104 so as to be at the focal point of collimating lens 102. The lens 102 serves to collimate the beam 191 prior to entry of the beam into the main passageway or hall 157 of microchip 100. It should be appreciated that an optical switch 104 having no lens 102 at the entry to hall 157 can be provided. Furthermore, a collimated input laser beam 191 can be directed through free space into input port 150, that is without the use of inlet fiber 98, and be within the scope of the present invention.

In FIG. 12 the actuators or micromotors 180 are shown as fabricated in an at rest or home position, midway between an extended and a retracted position. Actuators 180 are divided into a first set or plurality of six actuators 180a spaced apart along a first imaginary line spaced apart and parallel to the central longitudinal axis 113 of microchip 100 and a second set or plurality of six actuators 180b spaced apart along a second imaginary line spaced apart and parallel to the central axis 113 of microchip 100. Actuators 180a and 180b are disposed on opposite sides of the central axis 113 and thus oppose each other. Mirrors 103 of the actuators 180 are each inclined at an angle of 45 degrees relative to axis 113 and generally face input port 150. The mirrors 103 of first actuators 180a serving to direct the beam 191 through an angle of 90 degrees so that the beam 191 extends in a first direction perpendicular to the central axis and toward the right of apparatus. The mirrors 103 of the second actuators 180b serving to direct the beam 191 through an angle of 90 degrees so that the beam 191 extends in a second direction perpendicular to the central axis and toward the left of apparatus. Thus, the mirrors 103 of the first actuators 180a direct beam 191 in a direction opposite from the mirrors of the second actuators 180b.

A first plurality of six output or outlet ports 151 in alignment with mirrors 103 of first actuators 180a are provided on the right side of microchip 100 and a second plurality of six output ports 151 in alignment with mirrors 103 of second actuators 180a are provided on the left side of the microchip 100. An outlet groove 161 extends inwardly from each port 151 to hall 157 for carrying the respective output fiber 97 to a point nearby mirror 103. The jacket (not shown) for each fiber 97 begins at outlet port 151. It should be appreciated that mirrors having other inclinations relative to each other and/or the axis of the optical switch can be provided. A lens 102 is disposed between mirror 103 and the entry face of the respective output fiber 97 for focusing the beam 191 into the fiber 97. Although optical switch 104 is shown as being coupled to single-mode PM optical fibers 97, the switch 104 can 3be coupled to any suitable optical fiber and be within the scope of the present invention.

A pair of lenses 102 are serially disposed along longitudinal axis 113 at the center or middle of hall 157. The first or upper lens 102 is disposed approximately 4 millimeters below lens 102 adjacent output fiber 97 and serves to refocus the laser beam 191. The second or lower lens 102 at the middle of hall 157 is spaced at twice the focal point of the beam 191 exiting the lens 102 above and serves to recollimate laser beam 191 for travel along longitudinal axis 113 in the lower half of hall 157.

Figure 13:
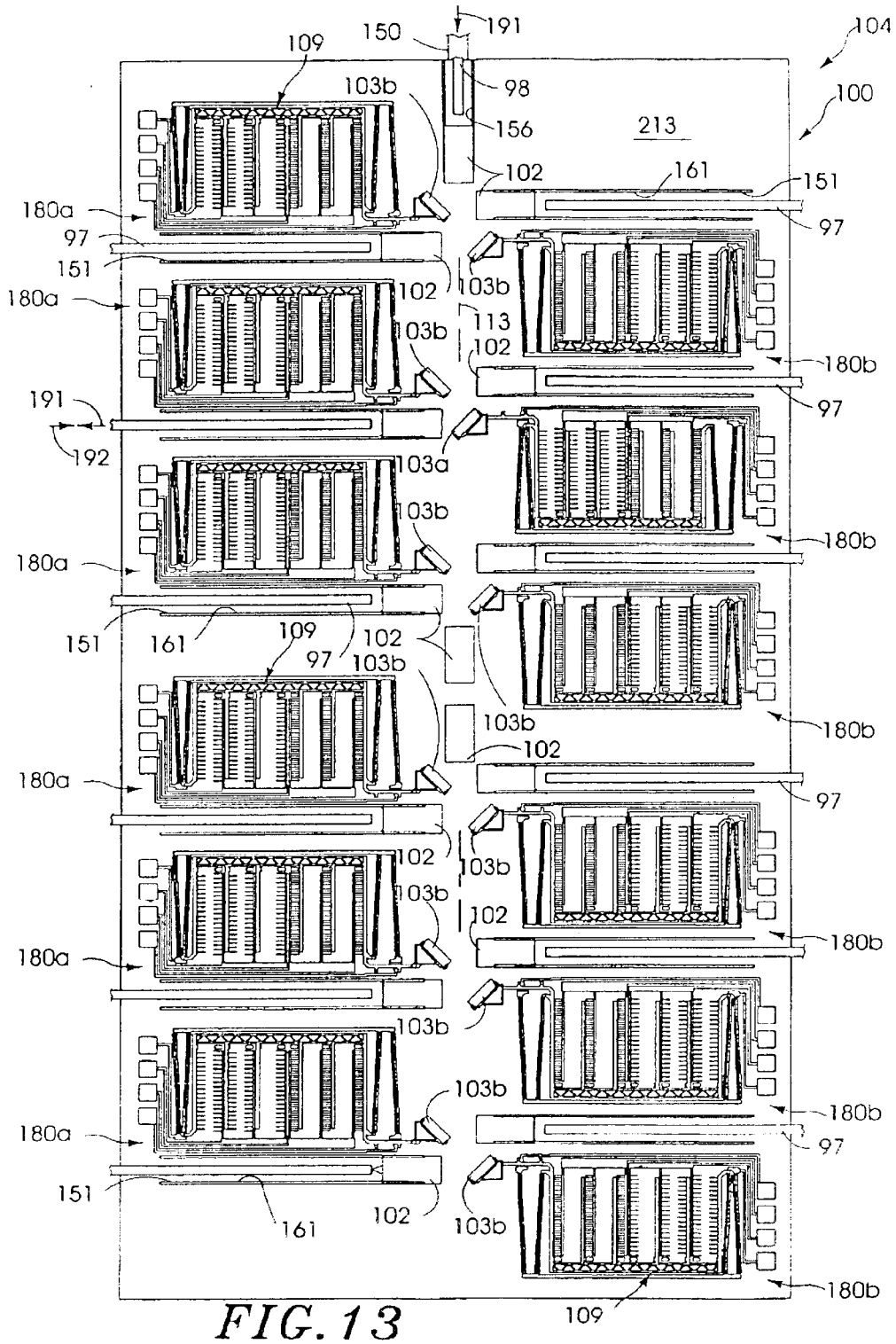
FIG. 13 is a plan view of the optical microswitch of FIG. 12 with one mirror extended and the remaining mirrors fully retracted.

As shown in FIG. 13, during operation one particular mirror 103a under the direction of controller 111 is fully extended by a respective actuator 180b into a position in the path of the beam 191, while the remaining mirrors 103b under the direction of controller 111 are retracted fully into a position out of the path of the beam 191. The beam 191 is reflected from the particular extended mirror 103a and is thus selectively directed by the mirror 103a towards a respective output port 151 and output fiber 97 coupled thereto. The beam 191 exits the output port 151 and may be directed through free space or alternatively by a second optical fiber and/or lens towards a destination. A beam 192 may also be directed from any one of the output ports 151 towards the input port 150. In the aforementioned embodiment it will be recognized that each of the mirrors 103 should be displacable by at least the width of the beam 191 between its fully retracted and fully extended positions. A typical laser beam 191 for use with optical switch 104 can have a diameter ranging from approximately 100 to 200 microns, requiring at least this much linear displacement of the mirrors 103 by the actuators 180. As previously mentioned, prior art actuators can typically provide only 40 microns of displacement at reasonable switching speeds.

Figure 10:
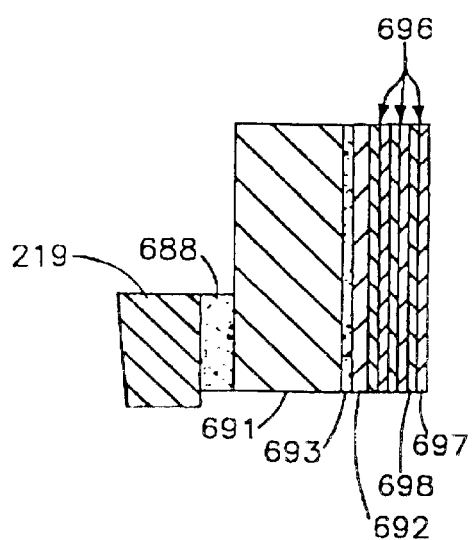
FIG. 10 is a cross-sectional drawing of the electrostatic microactuator of FIG. 8 taken along the line 10—10 of FIG. 8.

Because the present invention uses mirrors 103 to couple the beam 191 between an input port 150 and a particular output port 151, the quality of the mirror used is important. To minimize optical losses due to absorption, scattering, and defocusing, the mirror 103 surface must be reflective, smooth, and flat. For less critical applications, mirror 103 can be formed in place as the vertical wall of an etched surface during the fabrication of the devices. Mirrors 103 may be fabricated separately from very thin silicon wafers and later aligned and attached to bracket 219 on extension 218 by any suitable adhesive 688 such as Norland NEA 123M, an ultraviolet initiated adhesive sold by Norland Products, Inc. located in New Brunswick, N.J., as shown in FIG. 10 with respect to actuator 601. The mirrors 103 may be made from a thin silicon wafer 691 having a layer 692 of any suitable reflective metal such as gold secured to the wafer 691 by a thin adhesion layer 693 made from chromium or any other suitable material. Other suitable reflective materials for layer 692 include aluminum and silver and another suitable material for adhesion layer 693 includes titanium. The silicon wafer 691 has a thickness ranging from 20 to 300 microns and preferably approximately 80 microns and the reflective layer has a thickness ranging from 0.05 to 0.30 microns and preferably approximately 0.15 microns. The adhesion layer has thickness of approximately 0.005 microns. The metal layers may be deposited in a manner that minimizes their residual internal stress at room temperature. The large ratio of silicon-thickness to metal thickness also minimizes the bending of the mirror caused by the different thermal expansion rates of the coating layers and the silicon.

The resulting mirrors feature the high reflectivity of the gold or other reflective metal and the low surface roughness and high flatness of polished silicon.

Other layers or coatings may optionally be deposited over the reflective layer 692 to increase the reflectivity of mirror 103. In the mirror 103 shown in FIG. 10, multiple dielectric pairs 696 have been disposed on top of the reflective layer. Each pair 696 consists of a layer 697 of a relatively high index of refraction deposited on a layer 698 of a relatively low index of refraction. Layers 697 and 698 each have an optical thickness equivalent to one-quarter the wavelength of laser beams 191, 192. Suitable materials for layers 697 include cerium oxide and titanium oxide, while suitable materials for layers 698 include magnesium fluoride and silicon dioxide.

Figure 14:
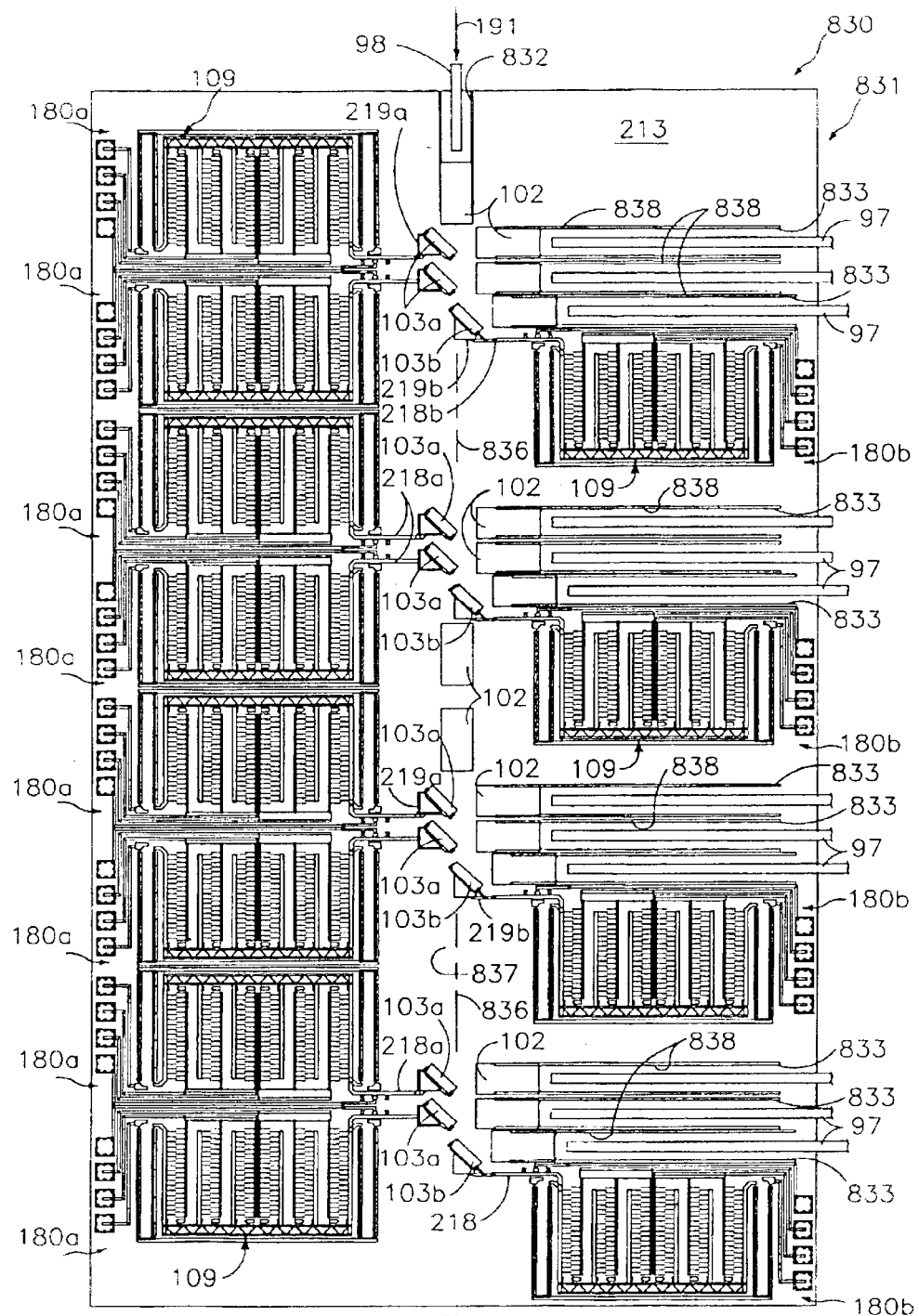
FIG. 14 is a plan view of a further embodiment of the optical microswitch of the present invention.

Optical switches of the present invention having other arrangements of microactuators can be provided for selectively redirecting laser beam 191 directed into the switch by input fiber 98. Optical microswitch 830 shown schematically in FIG. 14 is formed from a microchip 831 made by any suitable means such as described above with respect to switch 104. Like reference numerals have been used to describe like components of microswitches 104 and 830. The optical switch 830 includes an inlet port 832 coupled to inlet fiber 98 and a plurality of exit or outlet ports 833 spaced apart along one side of the switch 830 and coupled to respective output fibers 97. A central longitudinal axis 836 extends parallel to inlet port 832 and perpendicular to outlet ports 833 along the central passageway or hall 837 of switch 830. A first plurality of eight actuators or microactuators 180a are longitudinally spaced-apart along a first imaginary line extending parallel to and spaced-apart from the central axis 836 of optical switch 830. A second plurality of four actuators or microactuators 180b are longitudinally spaced-apart along a second imaginary line extending parallel to and spaced-apart from axis 836. The longitudinal axis 836 extends between the first set of actuators 180a and the second set of actuators 180b. In this manner, actuators or micromotors 180a oppose actuators or micromotors 180b.

Actuators 180a include mirrors 103a mounted on brackets 219a and actuators 180b include mirrors 103b mounted on brackets 219b, each of which mirrors 103a, 103b are substantially similar to mirror 103 described above. Mirrors 103a, 103b each generally face input port 832. A lens 102 is disposed between each mirror and the groove 838 for carrying optical fiber 97 to the respective outlet port 833. The mirrors 103a, 103b are each inclined at an angle of 45 degrees relative to longitudinal axis 836 so as to redirect a laser beam 191 impinging thereon through an angle of 90 degrees. Bracket 219a in each of actuators 180a is formed so that the mirror 103a mounted thereon deflects the laser beam 191 in a forwardly direction relative to the actuator 180a. Bracket 219b in each of actuators 180b is formed so that the mirror 103b mounted thereon deflects the laser beam 191 in a direction toward the actuator 180b. As such, the mirrors 103a, 103b all deflect the laser beam 191 in a plurality of parallel directions, and hence a single direction, so that the laser beam always exits from one side of optical switch 830.

Microactuators 180a are disposed in four sets of back-to-back pairs along the first imaginary line of microchip 831. As such, the extensions 218a, brackets 219a and mirrors 103a of each adjacent pair of actuators 180a are provided along adjoining sides of such actuators 180a. This arrangement of actuators 180a in microchip 831 permits the two endmost mirrors 103a to be positioned closer to the center of microswitch 830 so as to reduce the pathlength of laser beams 191, 192 within the microswitch. As a result, the input collimating lens 102 can be positioned further inwardly of microswitch 830. The back-to-back arrangement of actuators 180a also permits the two center lenses 102 to be disposed in front of the centermost two actuators 180a, permitting further reduction in the pathlength of laser beams 191, 192.

Input laser beam 191 travels from inlet port 832 along the central longitudinal axis 836 until it engages the mirror 103a, 103b selected by controller 111. Mirrors 103a and shuttles 109 of first actuators 180a are movable from a first or retracted position in which the mirrors 103 are out of the path of laser beam 191 to a second or extended position in which the reflective surfaces of the mirrors are disposed in the path of the laser beam so as to direct the laser beam through the respective outlet port 833. Mirrors 103b and shuttles 109 of second actuators 180b are movable from a first or retracted position in which the mirrors 103b are out of the path of laser beam 191 to a second or extended position in which the reflective surfaces of the mirrors are disposed in the path of the laser beam 191.

The extension 218 and bracket 219 of each actuator 180b is constructed so as to be out of the way of laser beam 191 when the mirror 103b is in its retracted or out of the way position. Actuators 180b require a larger travel or deflection than actuators 180a in order to so retract mirrors 103b and brackets 219 out of the path of laser beam 191 because of the alignment of mirrors 103b and brackets 219b relative to incoming laser beam 191. For example, actuators 180b in FIG. 13 require an additional deflection of 50 microns compared to actuators 180a. Hence, the comb drive fingers 211, 212 in the comb drive assemblies of actuators 180b are longer than the corresponding components in actuators 180a. The increases in size require larger drive voltages for actuators 180b. The direction of laser beam 191 outwardly from optical switch 83.0 in a plurality of parallel directions, and hence a single direction, reduces the complexity of an optical data storage system 95 in which the switch 830 is placed.

Figure 15:
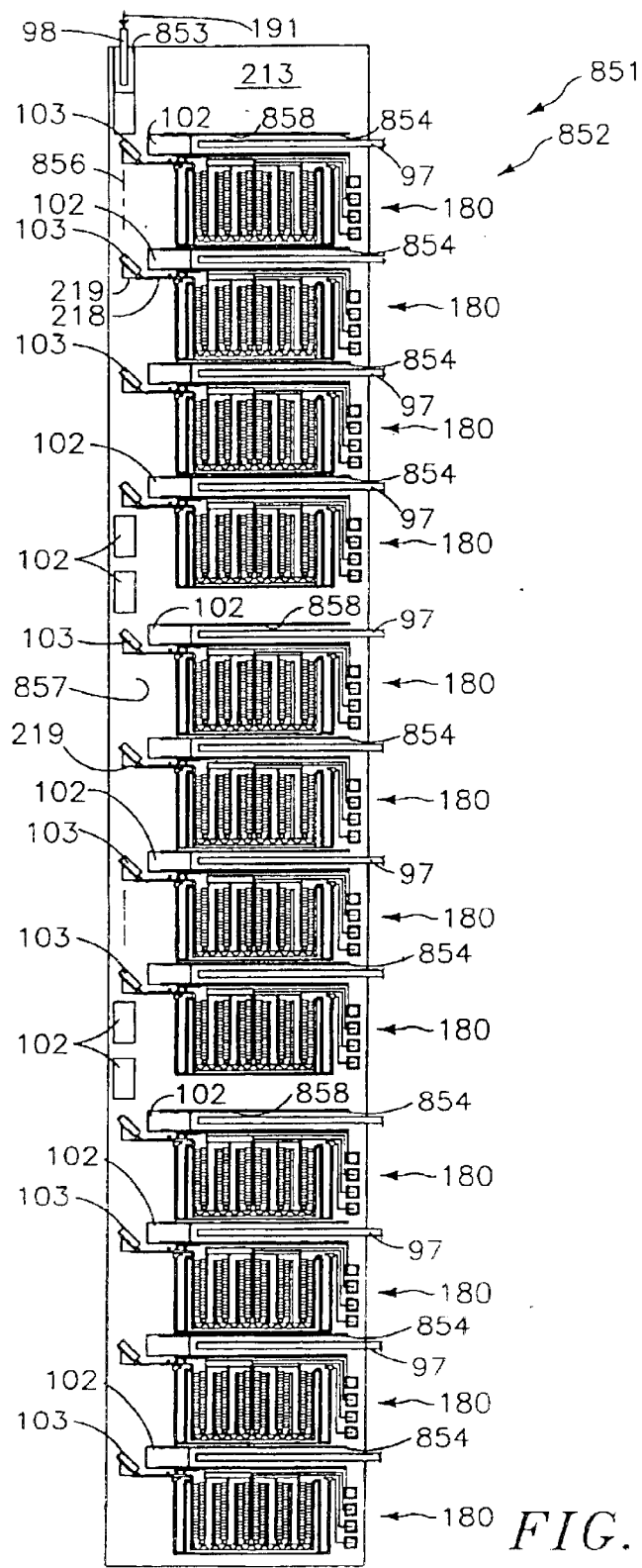
FIG. 15 is a plan view of another embodiment of the optical microswitch of the present invention.

Another optical switch which selectively directs input laser beam 191 outwardly from one side of the optical switch in a single direction is shown schematically in FIG. 15. Optical microswitch 851 therein has similarities to optical microswitches 104 and 830 and like reference numerals have been used to describe like components of microswitches 104, 830 and 851. The elongate optical switch 851 is formed from a microchip 852 having an inlet port 853 at one end thereof and a plurality of twelve outlet ports 854 spaced apart on one side thereof. A longitudinal axis 856 extends parallel to inlet port 853 and perpendicular to outlet ports 854 along a passageway or hall 857 of optical switch 851. The switch 851 has two sets of lens pairs 102 disposed within hall 857 for refocusing and recollimating laser beam 191 as the beam 191 travels upwardly through the hall 857. The two sets of lens pairs 102 divide the hall into three segments of approximately four millimeters each in length.

A plurality of twelve actuators 180 are disposed in longitudinally spaced-apart position along an imaginary line extending parallel to and spaced-apart from longitudinal axis 856. Actuators 180 each have a mirror 103 inclined at an angle of 45 degrees relative to longitudinal axis 856 so as to redirect laser beam 191 through an angle of 90 degrees. Mirror 103 of each actuator 180 is mounted on a bracket 219 and thus directs the laser beam 191 back toward the actuator 180 through the respective outlet port 854 disposed adjacent the back end of the actuator 180. An inlet optical fiber 98 is coupled to inlet port 853 and an outlet optical fiber 97 is coupled to each outlet port 854. A lens 102 is disposed between each mirror and the groove 858 for carrying optical fiber 97 to the respective outlet port 854. Mirrors 103 are each movable by a shuttle 109 of the respective actuator 180 between a first or retracted position in which the mirror 103 is out of the path of laser beam 191 and a second or extended position in which the mirror 103 is in the path of the laser beam 191. It should be appreciated that optical switch 830 can be provided with actuators 180 for directing the laser beam 191 forwardly of the actuator and be within the scope of the present invention. The design of optical switch 851 is efficient in its use of the surface area of substrate 213.

Figure 16:
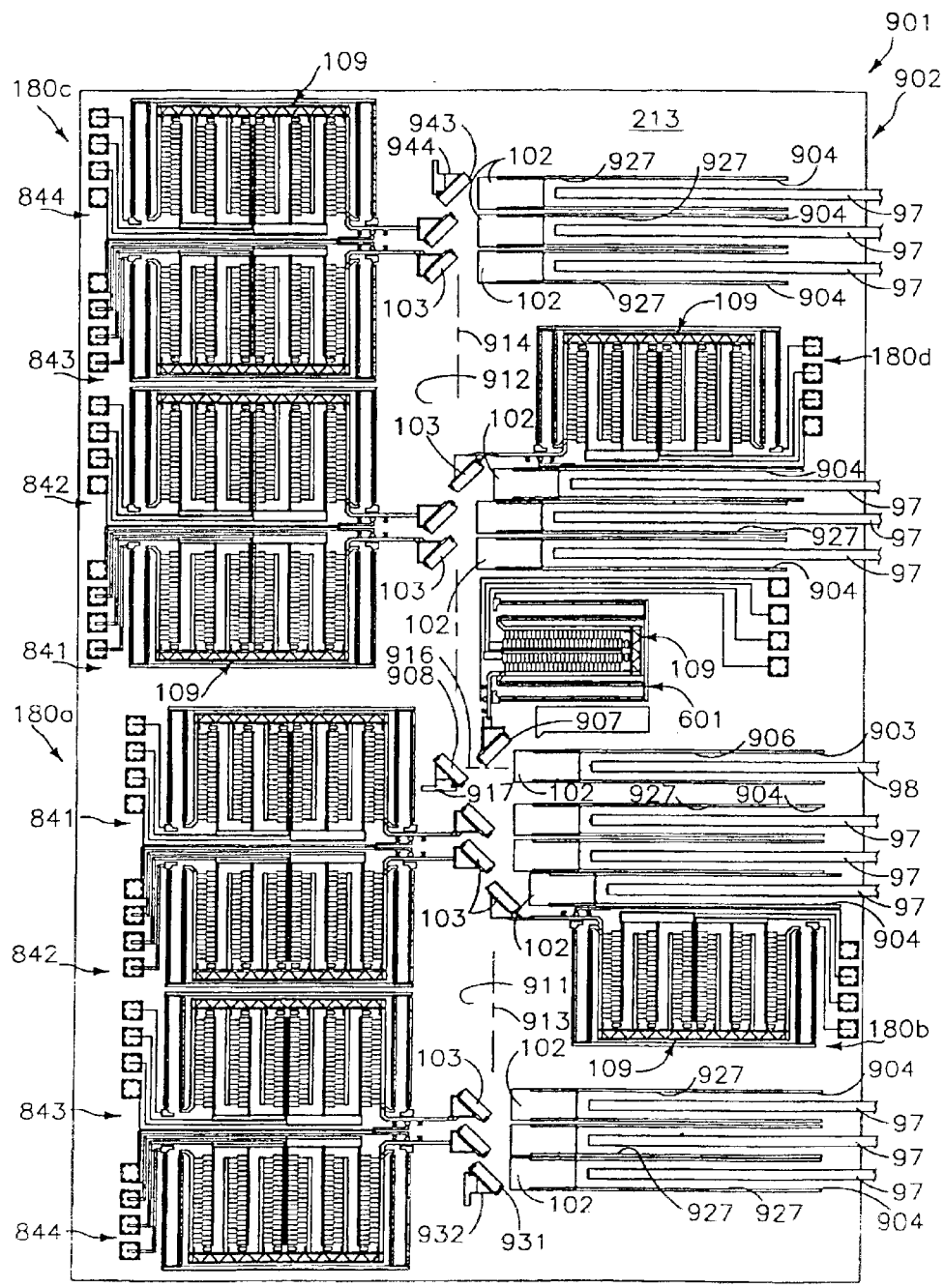
FIG. 16 is a plan view of yet a further embodiment of the optical microswitch of the present invention.

A further embodiment of an optical switch of the present invention wherein outgoing laser beam 191 exits from only a single side of the optical switch is shown schematically in FIG. 16. Optical switch 901 therein is formed from a microchip 902 having a single input port 903 coupled to input fiber 98 on one side of the microchip 902. A groove 906 is provided in microchip 902 for carrying input fiber 98 from inlet port 903. A plurality of twelve outlet ports 904 coupled to PM optical fibers 97 are spaced apart on the same side of microchip 902 as input port 903.

First and second directional mirrors 907, 908, substantially similar to mirrors 103 described above, are included within the means of optical switch 901 for alternatively directing the laser beam 191 along a downwardly extending passageway or hall 911 or an upwardly extending passageway or hall 912 of microchip 902, respectively. Halls 911, 912 extend along respective longitudinal axes 913, 914, which are spaced apart and extend parallel to each other and to the sides of microchip 902. Mirrors 907, 908 are each inclined at an angle of 45 degrees relative to axes 913, 914 and each generally face inlet port 903. A transverse axis 916 extends from inlet port 903 across the microchip 902 perpendicularly of axes 913, 914.

First directional mirror 907 is attached to an actuator 601 and is movable upwardly and downwardly within optical switch 901 from a first or retracted position in, which the mirror 907 is in an upwardly position out of the path of laser beam 191 extending along transverse axis 916 and a second or extended position in which the mirror 907 is in a downwwardly position within the path of laser beam 191 and thus serves to deflect the laser beam through an angle of 90 degrees so that the beam 191 extends downwardly along a first path extending along the first longitudinal axis 913 of the switch.

Second directional mirror 908 is disposed behind first mirror 907 and is rigidly mounted to microchip 902 by a bracket 917 etched from the microchip 902. Input laser beam 191 engages mirror 908 when the first mirror 907 is in its retracted position. Second mirror 908 serves to direct beam 191 upwardly through an angle of 90 degrees so that the beam travels along a second path along the second longitudinal axis of microchip 902.

A plurality of first actuators 180a are longitudinally spaced-apart along a first imaginary line extending parallel to first longitudinal axis 913 and at least one second actuator and as shown a single actuator 180b is disposed on a second imaginary line also extending parallel to the longitudinal axis 913. The four actuators 180a are substantially opposed to the second actuator 180b and longitudinal axis 913 extends between the actuators 180a and the actuator 180b. First actuators 180a include four actuators 841, 842, 843 and 844 longitudinally spaced apart along the first imaginary line in sequential order from the top to the bottom of lower hall 837. Actuators 841, 842 are disposed side-by-side along the first imaginary line so that extensions 218 thereof extend parallel to each other along adjacent sides of actuators 841, 842. Actuators 843, 844 are similarly disposed side-by-side along the first imaginary line so that extensions 218 thereof extend parallel to each other along adjacent sides of the actuators 843, 844.

A plurality of third actuators 180c are longitudinally spaced apart along a third imaginary line which extends parallel to second longitudinal axis 914 and at least one fourth actuators and as shown a single actuator 180d is disposed on a fourth imaginary line which also extends parallel to second longitudinal axis 914. In general, first and second actuators or microactuators 180a and 180b are disposed on one side of transverse axis 916 so as to be on one-half of microchip 902, and third and fourth actuators or microactuators 0.180c and 180d are disposed on the other side of transverse axis 916 so as to be on the other half of microchip 902. More specifically, the arrangement of actuators about upper longitudinal axis 914 is a mirror image of the arrangement of actuators about lower longitudinal axis 913. As such, the four actuators 180c are substantially opposed to the fourth actuator 180d and longitudinal axis 914 extends between the actuators 180c and the actuator 180d. The four actuators 841–844 of third actuators 180c are longitudinally spaced apart along the third imaginary line in sequential order from the bottom to the top of upper hall 912.

Actuators 180a–180d each have a mirror 103 movable between a first or retracted position out of the path of laser beam 191, as redirected or deflected by first directional mirror 907 to third and fourth actuators 180c, 180d or by second directional mirror 908 to first and second actuators 180a, 180b, and a second or extended position in which the reflective surface of the mirror 103 is disposed in the path of the laser beam 191. Such mirrors 103 each generally face directional mirrors 907, 908 and are each inclined at an angle of 45 degrees relative to their respective first longitudinal axis 913 or second longitudinal axis 914 for directing by reflection laser beam 191 through an angle of 90 degrees relative to such longitudinal axis. More specifically, each of mirrors is inclined at an angle to selectively direct laser beam 191 in a single direction through the respective outlet port 904 on the one side of optical microswitch 901. The deflected laser beam is received by a collimating lens 102 which in turn launches the laser beam into one of output fibers 97. A groove 927 is provided in the microchip 902 for carrying the optical fiber 97 to the respective outlet port 904.

As discussed above, microactuators 180a and 180c are each disposed in two sets of back-to-back pairs along respective halls 911, 912 in the same manner as microactuators 180a of optical microswitch 830. This arrangement of actuators 180a, 180c in microchip 902 permits the mirrors 103 of actuators 844 in the lower and upper halls to be positioned closer to the respective directional mirror 907, 908 so as to reduce the pathlength of laser beams 191, 192 in the microswitch 901 and thus increase the coupling efficiency of the switch 901. The back-to-back arrangement of actuators 180a, 180c also allows the actuator 601 to be positioned in front of actuators 641, permitting further reduction in the pathlength of laser beams 191, 192 within microswitch 901.

A mirror 931 is rigidly mounted to microchip 902 by means of a bracket 932 etched from the microchip 902 at the lower end of lower hall 911. Mirror 931 is disposed below the mirrors 103 of first and second actuators 180a, 180b and in front of the lowermost actuator 180a. Mirror 931 is inclined at an angle of 45 degrees relative to longitudinal axis 913. When the mirrors 103 of first and second actuators 180a, 180b are each in a retracted position, laser beam 191 is deflected by mirror 931 through an angle of 90 degrees so as to travel in a direction away from first actuators 180a through a collimating lens 102 into an output fiber 97 extending through an output port 904. A similar mirror 943 is rigidly mounted to microchip 902 by a bracket 944 at the top of upper hall 912 in front of third actuators 180c. Mirror 943 operates in substantially the same manner as mirror 931 and serves to deflect the laser beam 191 through a respective output port 904 when mirrors 103 of first and second actuators 180c, 180d are each in a retracted position. Mirror 103, 931 and 943 deflect the laser beam in a plurality of parallel directions and hence a single direction so that the laser beam 191 always exits from one side of optical microswitch 901. The utilization of fixedly mounted mirrors 931, 943 instead of a further microactuator and accompanying movable mirror further reduces the length of the halls 911, 912 and thus the pathlength of laser beams 191, 192. As can be seen, optical switch 901 can be utilized for selectively directing laser beam 191 to one of twelve output fibers 97.

Optical microswitch 901 is advantageous in that it reduces the maximum path which laser beam 191 or laser beam 192 must travel through the optical switch. Directional mirrors 907, 908 deflect laser beam 191 through one of halls 911, 912, each of which is shorter in length than halls 157 of switch 104, hall 837 of switch 830 and hall 857 of switch 851. Such reduced path length increases the coupling efficiency of the switch 901. It should be appreciated that alternate embodiments of the optical switch of the present invention can be provided having further subdivisions of actuators for minimizing the maximum travel path of laser beams 191, 192.

Figure 17:
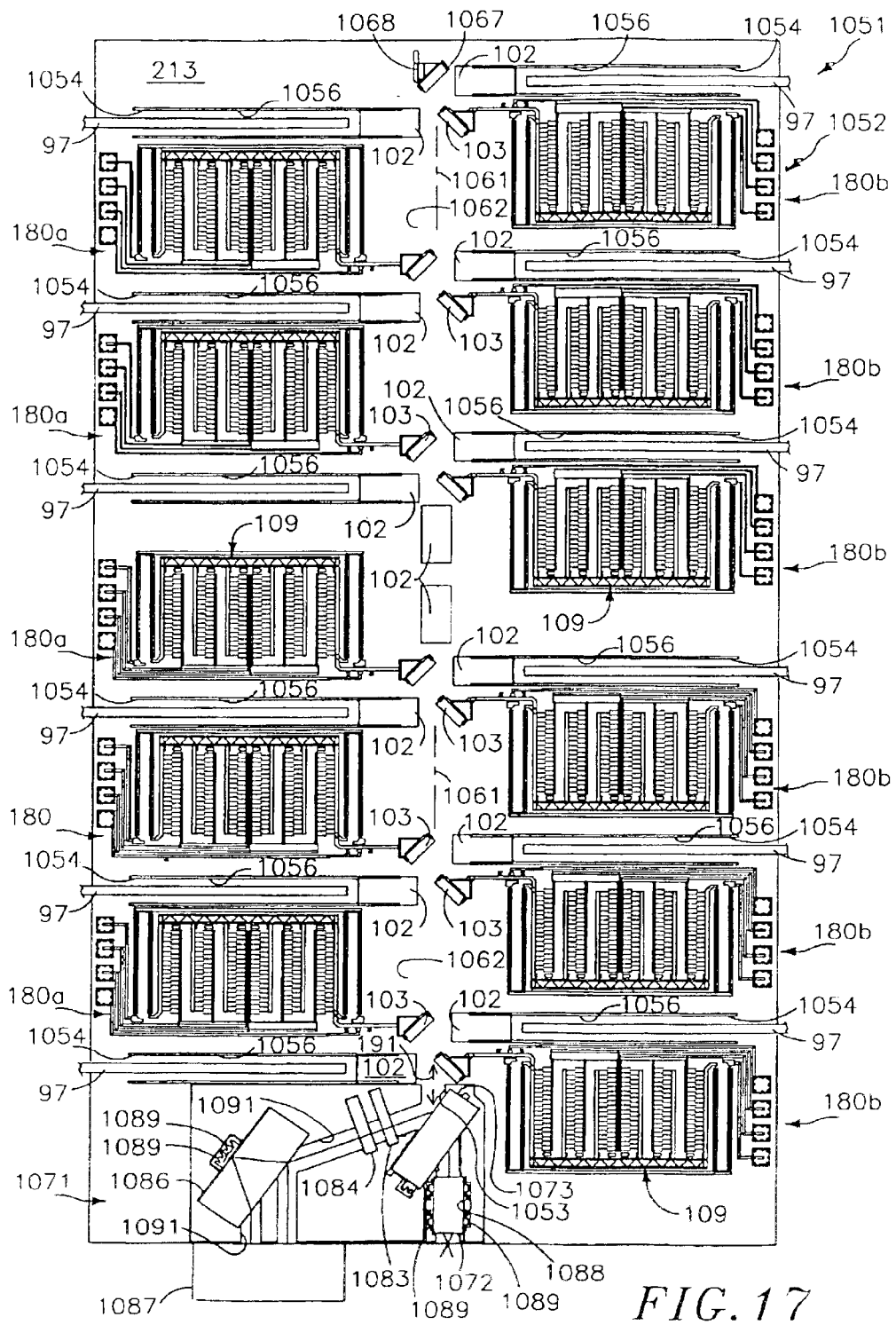
FIG. 17 is a plan view of yet another embodiment of the optical microswitch of the present invention.

Optical microswitches similar to any of the switches, described above can be provided having an optics assembly similar to laser-optics assembly 96 discussed above integrated onto the microchip of the optical switch. Optical microswitch 1051 shown schematically in FIG. 17 is formed from a microchip 1052 made from any suitable means such as described above with respect to switch 104. Microswitch 1051 has similarities to switches 104 and 830 described above and like reference numerals have been used to describe like components of switches 104, 830 and 1051. Microswitch 1051 includes an inlet port 1053 and a plurality of exit or outlet ports 1054 spaced apart along both sides of the switch 1051. Outlet ports 1054 are coupled to respective output fibers 97, a portion of which is shown in FIG. 17. Each of the output fibers 97 extends through the respective outlet port 1054 to a passageway or groove 1056 provided in microchip 1052. A central longitudinal axis 1061 extends from inlet port 1053 along a central passageway or hall 1062 extending longitudinally through the center of microchip 1052.

A first plurality of actuators or microactuators 180a are longitudinally spaced apart along a first imaginary line extending parallel to and spaced apart from the central axis 1061. A second plurality of actuators or microactuators 180b are longitudinally spaced apart along a second imaginary line extending parallel to and spaced apart from axis 1061. The central longitudinal axis 1061 extends between the first actuators 180a and the second actuators 180b and, as such, first actuators 180a oppose second actuators 180b relative to longitudinal axis 1061. Although a single or any plurality of actuators 180 can be provided, five first actuators 180a and six second actuators 180b are provided in switch 1051.

First plurality of actuators 180a and second plurality of actuators 180b each include a mirror 103 mounted on a bracket 219. Mirrors 103 are each inclined at an angle of 45 degrees relative to longitudinal axis 1061 so as to generally face inlet port 1053 and direct laser beam 191 through an angle of 90 degrees relative to axis 1061. The redirected laser beam 191 reflects from each mirror 103 along a path extending forwardly of the actuator 180 to exit the respective outlet port 1054. Mirrors 103 are each movable by the shuttle 109 of the respective actuator 180 between a first or retracted position in which the mirror is out of the path of laser beam 191 to a second or extended position in which the mirror is disposed in the path of the laser beam extending from inlet port 1053. A mirror 1061 is rigidly mounted to microchip 1102 by a bracket 1068 at the top of hall 1062. Mirror 1067 serves to deflect the laser beam 191 through a respective output port 1054 when mirrors 103 of first and second actuators 180a, 180b are each in a retracted position. Mirror 1067 eliminates the need for one actuators in optical switch 1051 and, by doing so, reduces the complexity of switch 1051 and the collimated path of the laser beams traveling through the switch 1051.

Laser micro-optics means which includes laser micro-optics assembly 1071 is mounted on substrate 213 at the bottom of microchip 1052 in front of the inlet port 1053. Micro-optics assembly 1071, like laser-optics assembly 96, includes a collimating optics lens 1072, substantially similar to collimating optics 234, for receiving a laser beam from the linearly polarized laser source 231 and focusing lens (not shown). Assembly 1071 further includes a low wavelength dispersion leaky beam splitter 1073 substantially similar to beam splitter 232 described above. Assembly 1071 has a quarter-wave plate 1083 substantially similar to quarter-wave plate 238 described above, an optional half-wave plate 1084, a polarizing beam splitter 1086 and photo detectors 1087. Photo detectors 1087 convert the optical signals received thereby to electrical signals. Each of the components of micro-optics assembly 1071 can be mounted to substrate 213 by any suitable means. For example, a recess or receptacle, such as receptacle 1088 for collimating optics lens 1072, can be provided in substrate 213 for receiving each component of assembly 1071, the components being secured within respective recesses by any suitable means such as an adhesive and/or springs 1089. A plurality of grooves 1091 are provided in microchip 1052 for facilitating the travel of laser beams through micro-optics assembly 1071.

As is well established in the art, the differential detection scheme of wave plates 1083, 1084, polarizing beam splitter 1086 and detectors 1087 measure the optical power in two orthogonal polarization components of the reflected laser beam 192 relative to input beam 191, with a differential signal being a sensitive measure of polarization rotation induced by the Kerr effect at the respective surface 108 of a MO disc 107. This differential signal can be processed by a differential amplifier 237 for output as an electrical signal.

Inclusion of micro-optics assembly 1071 on microchip 1052 simplifies alignment of the assembly 1071 relative to lenses 102, mirrors 103 and the other optical components of switch 1051. The recesses or other features of substrate 213 provided for aligning the components of micro-optics assembly 1071 on the substrate can be DRIE etched in a precise manner.

Figure 18:
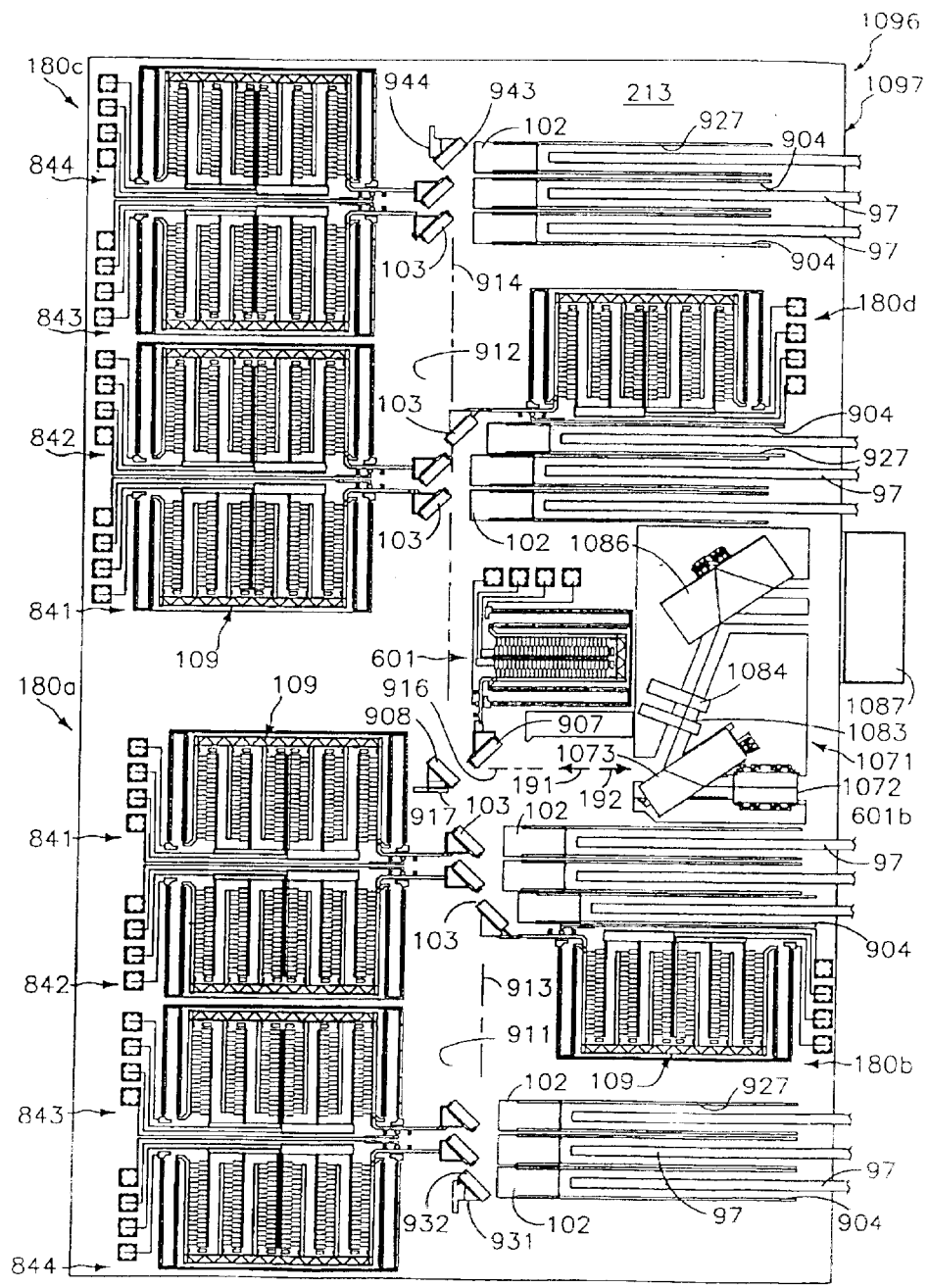
FIG. 18 is a plan view of a further embodiment of the optical microswitch of the present invention.

A micro-optic assembly similar to assembly 1071 can be provided on other switches herein and be within the scope of the present invention. For example, such an assembly can be provided on microchip 902 of optical microswitch 901 shown in FIG. 16. An optical microswitch 1096 formed from a microchip 1097 and substantially identical to microswitch 901 is shown in FIG. 18. Like reference numerals have been used in FIG. 18 to describe like components of optical microswitches 901 and 1096. Micro-optics assembly 1071 is mounted on microchip 1097 between second and fourth actuators 180b, 180d and in front of directional microactuator 601 connected to first directional mirror 907.

Optical microswitch 1096 advantageously provides for output fibers 97 each exiting the same side of the microchip 1097 and includes micro-optics assembly 1071 on the microchip 1097. The two hall design of microswitch 1096 and the close packing of the mirrors 103 in each of the halls provides switch 1096 with increased coupling efficiency.

Figure 19:
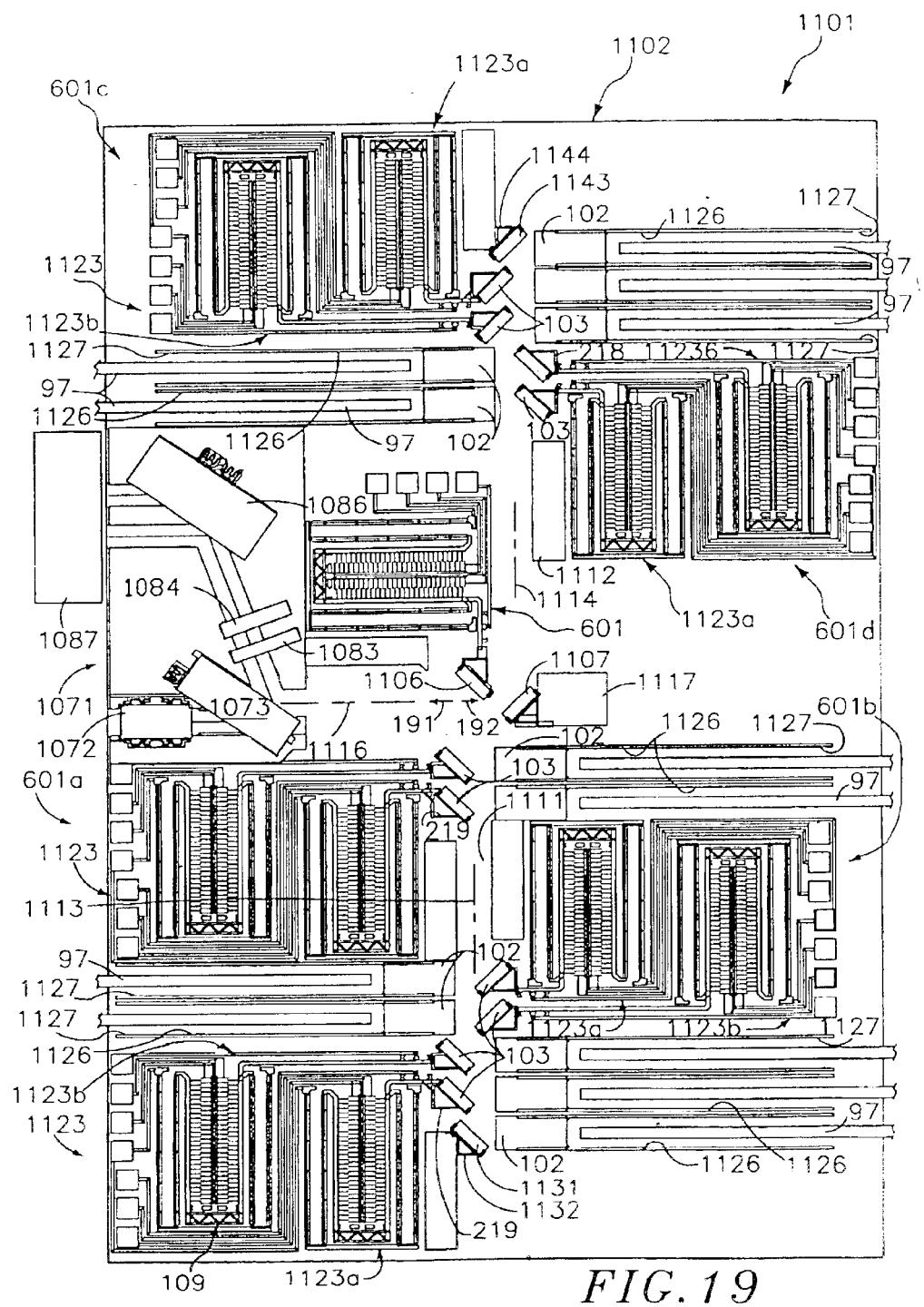
FIG. 19 is a plan view of yet a further embodiment of the optical microswitch of the present invention.

Another optical microswitch having a micro-optic assembly similar to assembly 1071 is shown in FIG. 19. Optical microswitch 1101 therein is formed from a microchip 1102 made from any suitable means such as described above with respect to optical microswitch 104 and is similar in many respects to optical microswitches 901 and 1096 herein. First and second directional mirrors 1106, 1107, substantially similar to mirrors 103 described above, are included within the means or assembly of optical switch 1101 for alternatively directing laser beam 191 along a downwardly extending passageway or hall 1111 or an upwardly extending passageway or hall 1112 of microchip 1102. Halls 1111, 1112 extend along respective longitudinal axes 1113, 1114, which are spaced apart and extend parallel to each other and to the sides of microchip 1102. Mirrors 1106, 1107 are each inclined at an angle of 45 degrees relative to respective axis 1113, 1114. A transverse axis 1116 extends across the center of microchip 1102 perpendicularly of axis 1113, 1114. First directional mirror 1106 is attached to an actuator 601 and operates in substantially the same manner as first directional mirror 907 in actuator 901. Input laser beam 191 engages second directional mirror 1107, substantially similar to second directional mirror 908 of actuator 901, when the first directional mirror 1106 is in its retracted position. The second directional mirror 1107 is rigidly mounted to microchip 1102 by a bracket 1117 etched from the microchip 1102 and operates in the same manner as second directional mirror 908 to direct laser beam 191 through an angle of 90 degrees so that the beam travels along a second path along second longitudinal axis 1114 of microchip 1102.

A plurality of first actuators 601a are disposed along one side of lower longitudinal axis 1113 and a plurality of second actuators 601b are disposed along the opposite side of axis 1113 so that laser beam 191 deflected by first directional mirror 1106 extends between first and second actuators 601a, 601b. First and second actuators 601a, 601b are thus opposed relative to longitudinal axis 1113. More specifically, first actuators 601a include a plurality of actuators longitudinally spaced apart along axis 1113. As shown first actuators 601a include first and second sets of actuator pairs 1123 longitudinally spaced apart along longitudinal axis 1113. Each actuator pair 1123 includes first and second actuators 1123a and 1123b disposed side by side along an imaginary line extending perpendicularly of longitudinal axis 1113. First actuator 1123a is disposed behind second actuator 1123b relative to axis 1113. As such, extension 218 of the second actuator 1123b extends forward of the actuator 1123b alongside actuator 1123a so as to terminate at a point approximately equal to the termination point of extension 218 of first actuator 1123a.

Mirrors 103 of first and second actuators 1123a, 1123b are disposed at longitudinally spaced-apart positions along axis 1113 in close proximity to each other. The mirror 103 of each of first and second actuators 1123a, 1123b is movable by the actuator from a first or retracted position out of the path of laser beam 191 to a second or extended position in which the mirror 103 is disposed in the path of laser beam 191. Brackets 219 are each inclined at an angle of 45 degrees relative to axis 1113 so as to direct laser beam 191 through an angle of 90 degrees. The deflected laser beam extends forwardly of the actuator so as to be received by a collimating lens 102 which in turn launches the laser beam 191 into one of output fibers 97. A passageway 1126 is provided in microchip 1102 for receiving output fiber 97. Passageway 1126 extends to an output port 1127 provided on the side of microchip 1102. The second actuator pair 1123 of first actuators 601a is disposed below the first actuator pair 1123 of the first actuators 601a.

Second actuators 601b include a single actuator pair 1123 disposed between the collimating lenses 102 relating to the upper actuator pair 1123 of first actuators 601a and the collimating lenses relating to the lower actuator pair 1123 of the first actuators 601a. A pair of collimating lenses 102 are disposed opposite the mirrors 103 of second actuators 601b for launching the respective laser beam 191 into respective output fibers 97. These fibers 97 extend through respective passageways 1126 to respective output ports 1127 provided on the opposite side of microchip 1102 from the output ports 1127 corresponding to first actuators 601a. A mirror 1131 is rigidly mounted to microchip 1102 by means of a bracket 1132 etched from the microchip 1102. Mirror 1131 is disposed at the end of lower hall 1111 below the mirrors 103 of first and second actuators 601a, 601b and in front of the lower actuator pair 1123 of first actuators 601a. Mirror 1131 is inclined at an angle of 45 degrees relative to longitudinal axis 1113. When the mirrors 103 of first and second actuators 601a, 601b are each in a retracted position, laser beam 191 is deflected by mirror 1131 through an angle of 90 degrees so as to travel in a direction away from first actuators 601a through a collimating lens 102 into an output fiber 97 extending through an output port 1127.

A plurality of third actuators 601c are disposed above first actuators 601a on one side of upper longitudinal axis 1114 and a plurality of fourth actuators 601d are disposed above second actuators 601b on the opposite side of upper longitudinal axis 1114. Third and fourth actuators 601c, 601d each include a single actuator or microactuator pair 1123 having first and second microactuators 1123a, 1123b. Laser beam 191 deflected by second directional mirror 1107 extends between third and fourth actuators 601c, 601d and, as such, third and fourth actuators 601c, 601d are opposed to each other relative to upper longitudinal axis 1114. A mirror 1143 is rigidly mounted to microchip 1102 by a bracket 1144 at the top of upper hall 1112 in front of third actuators 601c. Mirror 1143 operates in substantially the same manner as mirror 1131 and serves to deflect the laser beam 191 through a respective output port 1127 when mirrors 103 of first and second actuators 601c, 601d are each in a retracted position. As can be seen, optical switch 1101 can be utilized for selectively directing laser beam 191 to one of twelve output fibers 97.

Micro-optics assembly 1071 is mounted on microchip 1102 between first and third actuators 601a, 601c and in front of actuator 601 connected to first directional mirror 1106. The inclusion of micro-optics assembly 1071 on optical switch 1101 is advantageous for the same reasons as discussed above with respect to optical switch 1051. It should be appreciated that an optical microswitch such as microswitch 1101 can be provided without micro-optics assembly 1071 and be within the scope of the present invention.

Actuator pairs 1123 of optical microswitch 1101 permit mirrors 103 in each of upper and lower halls 1111, 1112 to be placed longitudinally close together along respective axis 1113, 1114 so as to reduce the collimated path of laser beams 191, 192. Mirrors 1131 and 1143 rigidly mounted at the ends of respective halls 1111, 1112 eliminate the need for two microactuators in optical switch 1101. Mirrors 1131, 1143 thus also reduce the collimated path of the laser beams traveling through switch 1101.

As can be seen from the foregoing, an optical switch or microswitch has been provided which utilizes at least one i; electrostatic microactuator having at least one comb drive assembly therein. In one simple embodiment (not shown), the microswitch hereof is provided with a single electrostatic microactuator. In several embodiments, a plurality of electrostatic microactuators are aligned along at least one hall of the microswitch. The optical switch can be used in a magneto-optical data storage system.

While the present invention has been described herein with reference to specific embodiments of comb drive microactuators and specific embodiments of optical microswitches utilizing comb drive microactuators, the invention is broad enough to include embodiments having a latitude of modifications, changes and substitutions from the foregoing disclosure. Features of certain embodiments can be combined with other embodiments and be within the scope of the invention. The microswitches disclosed herein can use actuators not having comb drive assemblies. In addition, any of the microswitches disclosed herein can be used with a variety of other microactuators, including but not limited to any of the actuators disclosed in copending U.S. patent application Ser. No. 09/135,158 filed Aug. 17, 1998 the entire contents of which are incorporated herein by this reference. All of the above can be used in a magneto-optical data storage and retrieval system or in a variety of other systems which include telecommunications systems and network systems.

What is claimed is:

1. An optical microswitch for use with a laser beam that extends along a path comprising a body having an inlet port adapted to receive the laser beam and a plurality of outlet ports, a plurality of mirrors carried by the body, a plurality of micromotors carried by the body, microattachment means for rigidly coupling the plurality of mirrors to the respective plurality of micromotors whereby the micromotors selectively move the mirrors from a first position out of the path of the laser beam to a second position into the path of the laser beam to direct the laser beam to one of the outlet ports, each of the micromotors having at least one electrostatically-driven comb drive assembly therein for moving the respective mirror to one of the first and second positions, and a controller electrically coupled to the micromotors for providing control signals to the micromotors.

2. An optical microswitch as in claim 1 wherein the plurality of mirrors and plurality of micromotors include a first plurality of mirrors and corresponding micromotors and a second plurality of mirrors and corresponding micromotors, the path of the laser beam extendable between the first plurality of micromotors and the second plurality of micromotors so that the first plurality of micromotors oppose the second plurality of micromotors relative to the path of the laser beam.

3. An optical microswitch as in claim 2 wherein the first plurality of mirrors and corresponding micromotors are linearly disposed along a first imaginary line and the second plurality of mirrors and corresponding micromotors are linearly disposed along a second imaginary line extending parallel to the first imaginary line and the path of the laser beam.

4. An optical microswitch as in claim 2 wherein the first plurality of micromotors includes at least two micromotors disposed side by side along a first imaginary line extending perpendicularly of the path of the laser beam and the second plurality of micromotors includes at least two micromotors disposed side by side along a second imaginary line extending perpendicularly of the path of the laser beam.

5. An optical microswitch as in claim 2 wherein the first and second plurality of mirrors are each inclined to direct the laser beam in a single direction.

6. An optical microswitch as in claim 2 wherein the plurality of mirrors and plurality of micromotors include a third plurality of mirrors and corresponding micromotors and a fourth plurality of mirrors and corresponding micromotors, the path of the laser beam extendable between the third plurality of micromotors and the fourth plurality of micromotors so that the third plurality of micromotors oppose the fourth plurality of micromotors relative to the path of the laser beam, means including an additional mirror and corresponding additional micromotor for selectively directing the laser beam along a first path extending between the first and second plurality of micromotors and a second path extending between the third and fourth plurality of micromotors.

7. An optical microswitch as in claim 6 wherein the first and second plurality of mirrors and the third and fourth plurality of mirrors are inclined to direct the laser beam in a single direction.

8. An optical microswitch as in claim 1 wherein the plurality of mirrors and plurality of micromotors include at least one first mirror and corresponding first micromotor and at least one second mirror and corresponding second micromotor, the path of the laser beam extendable between the at least one first micromotor and the at least one second micromotor so that the at least one first micromotor opposes the at least one second micromotor relative to the path of the laser beam and wherein the plurality of mirrors and plurality of micromotors further include at least one third mirror and corresponding third micromotor and at least one fourth mirror and corresponding fourth micromotor, the path of the laser beam extendable between the at least one third micromotor and the at least one fourth micromotor so that the at least one third micromotor opposes the at least one fourth micromotor relative to the path of the laser beam, means including an additional mirror and corresponding additional micromotor for selectively directing the laser beam along a first path extending between the at least one first micromotor and the at least one second micromotors and a second path extending between the at least one third micromotor and the at least one fourth micromotor.

9. An optical microswitch as in claim 1 wherein the plurality of micromotors includes a plurality of at least two micromotors disposed side by side along an imaginary line extending perpendicularly of the path of the laser beam.

10. An optical microswitch as in claim 1 wherein a plurality of at least twelve mirrors and corresponding micromotors are provided for selectively directing the laser beam in a plurality of parallel directions.

11. An optical microswitch as in claim 1 wherein each mirror comprises a layer of silicon and a layer of a reflective material adhered to the layer of silicon whereby the layer of silicon provides a surface of low roughness and high flatness.

12. An optical microswitch as in claim 11 wherein each mirror further comprises at least one pair of dielectric layers overlying the layer of a reflective material, said at least one pair of dielectric layers including a first layer of a low dielectric material and a second layer of a high dielectric material.

13. An optical microswitch as in claim 1 wherein at least one of the micromotors includes travel stop means for limiting the movement of the corresponding mirror at the second position whereby the travel stop means facilitates repeatability in the operation of the optical microswitch.

14. An optical microswitch as in claim 13 further comprising lead means for electrically connecting the travel stop means to the controller whereby the travel stop means permits the controller to monitor when the mirror is in the second position.

15. An optical microapparatus for use with a laser beam that extends along a path comprising a body having an inlet port adapted to receive the laser beam and a plurality of outlet ports, a plurality of reflectors carried by the body, a plurality of micromotors carried by the body, each of the micromotors having at least one electrostatically-driven comb drive assembly, microattachment means for rigidly coupling the plurality of reflectors to the respective plurality of micromotors and a controller electrically coupled to the micromotors for providing control signals to the micromotors whereby each of the micromotors selectively moves the respective reflector from a first position out of the path of the laser beam to a second position into the path of the laser beam for directing light from the laser beam to an outlet port.

16. An optical microapparatus as in claim 15 wherein the plurality of reflectors and plurality of micromotors include a first plurality of reflectors and corresponding micromotors and a second plurality of reflectors and corresponding micromotors, the first plurality of micromotors opposing the second plurality of micromotors relative to the path of the laser beam so that the path of the laser beam extends between the first plurality of micromotors and the second plurality of micromotors.

17. An optical microapparatus as in claim 15 wherein each reflector comprises a layer of silicon and a layer of a reflective material adhered to the layer of silicon.

18. An optical microapparatus as in claim 15 wherein each reflector comprises a planar substrate, a reflective layer disposed over the planar substrate and at least one optically transparent quarter-wavelength thin film disposed over the reflective layer.

19. An optical microapparatus as in claim 18 wherein the reflective layer includes a gold layer.

20. An optical microapparatus as in claim 18 wherein the reflective layer includes an aluminum layer.

21. An optical microapparatus as in claim 18 further comprising an adhesion layer disposed between the reflective layer and the planar substrate for securing the reflective layer to the planar substrate.

22. An optical microapparatus as in claim 21 wherein the adhesion layer is made of chromium.

23. An optical microapparatus as in claim 18 wherein the at least one optically transparent quarter-wavelength thin film includes a quarter-wavelength silicon dioxide thin film.

24. An optical microapparatus as in claim 15 wherein each reflector comprises a planar substrate, a reflective layer, means for securing the reflective layer to the planar substrate, a first dielectric layer of a material having a relatively low index of refraction overlying the reflective layer and a second dielectric layer of a material having a relatively high index of refraction overlying the first dielectric layer for increasing the reflectivity of the micromachined reflector.

25. An optical microapparatus as in claim 24 for use with laser light having a wavelength wherein the first dielectric layer and the second dielectric layer each have an optical thickness equal to one-quarter the wavelength of the laser beam.

26. An optical microapparatus as in claim 24 wherein the first dielectric layer is a material selected from the group consisting of magnesium fluoride and silicon dioxide.

27. An optical microapparatus as in claim 24 wherein the second dielectric layer is a material selected from the group consisting of cerium oxide and titanium.

28. An optical microapparatus as in claim 24 wherein the reflective layer is a material selected from the group consisting of gold, silver and aluminum.

29. An optical microapparatus as in claim 24 wherein the means for securing the reflective layer to the planar substrate is an adhesion layer.

30. An optical microapparatus as in claim 29 wherein the adhesion layer is a material selected from the group consisting of chromium and titanium.

31. An optical microapparatus as in claim 24 further comprising an additional first dielectric layer of a material having a relatively low index of refraction overlying the second dielectric layer and an additional second dielectric layer of a material having a relatively high index of refraction overlying the additional first dielectric layer.

* * * * *